United States Patent
Vasudevan et al.

(10) Patent No.: US 11,762,836 B2
(45) Date of Patent: Sep. 19, 2023

(54) SYSTEM AND METHOD FOR CAPTURE OF CHANGE DATA FROM DISTRIBUTED DATA SOURCES, FOR USE WITH HETEROGENEOUS TARGETS

(71) Applicant: ORACLE INTERNATIONAL CORPORATION, Redwood Shores, CA (US)

(72) Inventors: Sanal Vasudevan, Melbourne (AU); Lego Haryanto, Rocklin, CA (US); Scott Roger Corbin, Spooner, WI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/145,707

(22) Filed: Sep. 28, 2018

(65) Prior Publication Data
US 2019/0102418 A1    Apr. 4, 2019

Related U.S. Application Data

(60) Provisional application No. 62/566,113, filed on Sep. 29, 2017.

(51) Int. Cl.
G06F 16/27    (2019.01)
G06F 16/23    (2019.01)

(52) U.S. Cl.
CPC ...... G06F 16/2358 (2019.01); G06F 16/2365 (2019.01); G06F 16/27 (2019.01)

(58) Field of Classification Search
CPC ......... G06F 17/30368; G06F 17/30371; G06F 16/2358; G06F 16/27; G06F 16/2365

(Continued)

(56) References Cited

U.S. PATENT DOCUMENTS 6,016,501 A    1/2000    Martin et al.
7,076,508 B2   7/2006    Bourbonnais et al.
(Continued)

FOREIGN PATENT DOCUMENTS

JP    H08-179980    7/1996
JP    2014044532    3/2014

OTHER PUBLICATIONS

United States Patent and Trademark Office, Ex Parte Quayle Action mailed Oct. 18, 2019 for U.S. Appl. No. 15/881,432, 16 pages.

(Continued)

*Primary Examiner* — Hosain T Alam
*Assistant Examiner* — Robert F May
(74) *Attorney, Agent, or Firm* — TUCKER ELLIS LLP

(57) ABSTRACT

In accordance with an embodiment, described herein is a system and method for capture of change data from a distributed data source system, for example a distributed database or a distributed data stream, and preparation of a canonical format output, for use with one or more heterogeneous targets, for example a database or message queue. The change data capture system can include support for features such as distributed source topology-awareness, initial load, deduplication, and recovery. A technical purpose of the systems and methods described herein includes determination and communication of changes performed to data at a distributed data source that includes a large amount of data across a plurality of nodes, to one or more target computer systems.

21 Claims, 18 Drawing Sheets

(58) Field of Classification Search
USPC .......................................................... 707/690
See application file for complete search history.

(56) References Cited

U.S. PATENT DOCUMENTS

| | | | | |
|---|---|---|---|---|
| 7,257,690 | B1 | 8/2007 | Baird | |
| 7,310,716 | B2 | 12/2007 | Galipeau et al. | |
| 7,321,939 | B1* | 1/2008 | Porter | G06Q 10/107 709/217 |
| 7,360,111 | B2 | 4/2008 | Adya et al. | |
| 7,716,181 | B2* | 5/2010 | Todd | G06F 11/2097 707/637 |
| 8,510,270 | B2 | 8/2013 | Pareek | |
| 9,860,314 | B2 | 1/2018 | Kore | |
| 9,910,904 | B2 | 3/2018 | Anglin | |
| 2005/0165858 | A1* | 7/2005 | Tom | G06F 16/27 |
| 2006/0235715 | A1* | 10/2006 | Abrams | G06Q 40/04 705/1.1 |
| 2010/0205151 | A1* | 8/2010 | Kuroide | G06F 11/2028 707/E17.007 |
| 2010/0274768 | A1* | 10/2010 | Wang | G06F 16/27 711/135 |
| 2012/0030172 | A1* | 2/2012 | Pareek | G06F 16/275 707/635 |
| 2012/0303559 | A1* | 11/2012 | Dolan | G06N 20/00 706/12 |
| 2013/0054523 | A1 | 2/2013 | Anglin | |
| 2013/0054524 | A1* | 2/2013 | Anglin | G06F 16/27 707/624 |
| 2013/0246376 | A1* | 9/2013 | Padmanabhan | G06F 16/254 707/694 |
| 2016/0048408 | A1 | 2/2016 | Madhu | |
| 2016/0057219 | A1 | 2/2016 | Kore | |
| 2017/0262345 | A1 | 9/2017 | Wang | |

OTHER PUBLICATIONS

European Patent Office, Communication pursuant to Article 94(3) EPC dated Jan. 24, 2020 for EP Application 18182168.7, 4 pages.
Chaudhry, Imran, "DSE Advanced Replication in DSE 5.1", published Jul. 11, 2017, https://www.datastax.com/dev/blog/advanced-replication-in-dse-5-1, 11 pages.
"DirXML 1.0 Administration Guide: Removing the Boundaries for E-Business", Novell, Inc., Nov. 2000, 104 pages.
International Search Report and the Written Opinion of the International Searching Authority dated Dec. 13, 2018 for PCT Application No. PCT/US2018/053441, 10 pages.
"Oracle Fusion Middleware: Using Oracle GoldenGate for Big Data", Release 12.3.2.1, May 2018, 335 pages.
Oracle Help Center, "Fusion Middleware Using Oracle GoldenGate for Big Data: 17 Using Oracle GoldenGate Capture for Cassandra", 27 pages.
Vajda, Vladimir, "Cassandra to Kafka Data Pipeline (Part 1)", published Aug. 12, 2017, https://dzone.com/articles/cassandra-to-kafka-data-pipeline-part-1, 11 pages.
Vajda, Vladimir, "Cassandra to Kafka Data Pipeline (Part 2)", published Nov. 20, 2017, https://dzone.com/articles/cassandra-to-kafka-data-pipeline-part-2, 7 pages.
United States Patent and Trademark Office, Notice of Allowance dated Jul. 9, 2020 for U.S. Appl. No. 15/881,432, 12 pages.
Apache Cassandra, "Open Source NoSQL Database", retrieved from https://cassandra.apache.org/ on Jul. 1, 2021, 10 pages.
Novell, "Novell Nsure Identity Manager", Administration Guide, 2.0.1, May 4, 2005, retrieved from https://www.novell.com/documentation/dirxml20/pdfdoc/admin/admin.pdf, 292 pages.
Wikipedia, "CAP theorem", retrieved from https://en.wikipedia.org/wiki/CAP_theorem on Jul. 1, 2021, 4 pages.
Wikipedia, "NoSQL", retrieved from https://en.wikipedia.org/wiki/NoSQL on Jul. 1, 2021, 12 pages.
Indian Patent Office, First Examination Report dated Feb. 23, 2021 for Indian Patent Application No. 201947026505, 7 pages.
Japanese Patent Office, Office Action dated Mar. 2, 2021 for Japanese Patent Application No. 2020-500202, 8 pages.
European Patent Office, Communication pursuant to Article 94(3) EPC dated Dec. 9, 2021 for European Patent Application No. 18788970.4, 6 pages.
Japanese Patent Office, Decision of Refusal dated Nov. 15, 2021 for Japanese Patent Application No. 2020-500202, 22 pages.
China National Intellectual Property Administration, Notification of the First Office Action dated Oct. 21, 2022 for Chinese Patent Application No. 201880007751.2 , 9 pages.
China National Intellectual Property Administration, Notification of Second Office Action, dated May 19, 2023, for Chinese Patent Application No. 201880007751.2; 7 pages.

* cited by examiner

SYSTEM AND METHOD FOR CAPTURE OF CHANGE DATA FROM DISTRIBUTED DATA SOURCES, FOR USE WITH HETEROGENEOUS TARGETS

CLAIM OF PRIORITY AND CROSS-REFERENCE TO RELATED APPLICATIONS

This application claims the benefit of priority to U.S. Provisional Patent Application titled "SYSTEM AND METHOD FOR CAPTURE OF CHANGE DATA FROM NOSQL DATABASES OR DISTRIBUTED DATA STREAMS, FOR USE WITH HETEROGENEOUS TARGETS", Application No. 62/566,113, filed Sep. 29, 2017; and is related to U.S. Patent Application titled "MYSQL DATABASE—HETEROGENEOUS LOG BASED REPLICATION", application Ser. No. 13/077,760, filed Mar. 31, 2011, subsequently issued as U.S. Pat. No. 8,510,270, which claims the benefit of priority to U.S. Provisional Patent Application titled "HETEROGENEOUS LOG BASED REPLICATION FROM DATABASES SUCH AS MYSQL DATABASES", Application No. 61/368,141, filed Jul. 27, 2010; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF TECHNOLOGY

Embodiments described by the present application relate to capture of change data from a distributed data source system, for use with one or more heterogeneous targets, including support for features such as distributed source topology-awareness, initial load, deduplication, and recovery.

BACKGROUND

Organizations may at times need to move data between different database environments, for example to create a backup of the data, or to enable sharing of the data between different database applications. Data replication systems help address this need, for example by detecting and replicating changes to the data in a database table, as a result of row operations, rather than copying the entire table and the data therein. Such an approach can be used to synchronize the data in a target database with the data in a source database.

However, environments that support very large data sets, for example big data environments, present challenges related to availability, scalability, and fault-tolerance; and traditional databases or data replication systems may not scale sufficiently to handle such larger amounts of data. Organizations are increasingly turning to systems that provide a distributed data source, for example databases such as Apache Cassandra, Kafka, MongoDB, Oracle NoSQL, or Google Bigtable, to address these considerations. These are some examples of the types of environments in which embodiments of the present teachings can be used.

SUMMARY

In accordance with an embodiment, described herein is a system and method for capture of change data from a distributed data source system, for example a distributed database or a distributed data stream, and preparation of a canonical format output, for use with one or more heterogeneous targets, for example a database or message queue. The change data capture system can include support for features such as distributed source topology-awareness, initial load, deduplication, and recovery. A technical purpose of the systems and methods described herein includes determination and communication of changes performed to data at a distributed data source that includes a large amount of data across a plurality of nodes, to one or more target computer systems.

DETAILED DESCRIPTION

Figure 1:
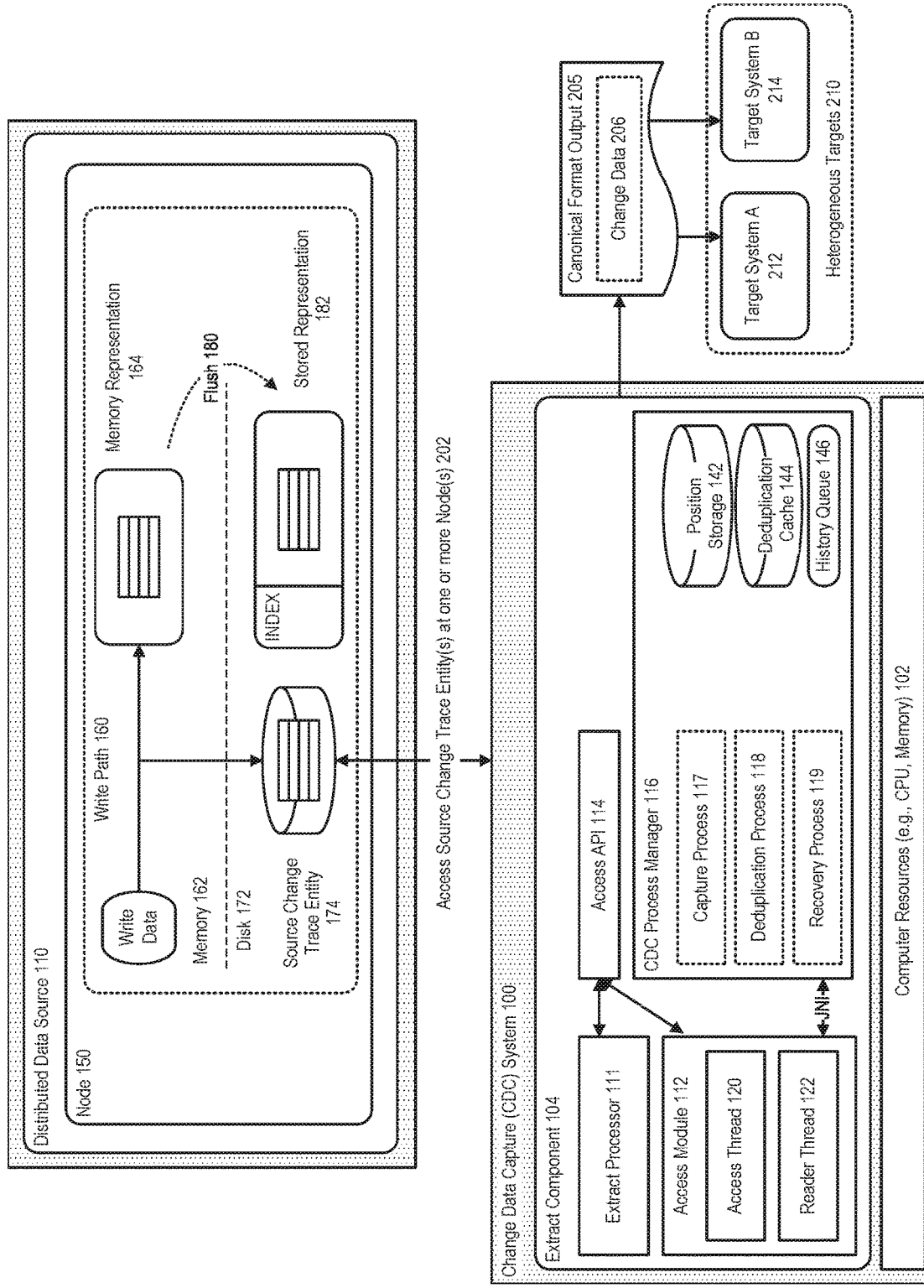
FIG. 1 illustrates a system for capture of change data from a distributed data source, for use with heterogeneous targets, in accordance with an embodiment.

As described above, organizations may at times need to move data between different database environments, for example to create a backup of the data, or to enable sharing of the data between different database applications. Data replication systems help address this need, for example by detecting and replicating changes to the data in a database table, as a result of row operations, rather than copying the entire table and the data therein. Such an approach can be used to synchronize the data in a target database with the data in a source database. However, environments that support very large data sets, for example big data environments, present challenges related to availability, scalability, and fault-tolerance.

For example, data replication systems which operate to read commit logs or transactions logs, to extract changes in the data source, face the following challenges: source systems may have more than one copy of data on various nodes; source systems are partition tolerant; some nodes may go down and not have network connectivity; and source system may have one or more new nodes added, leading to new data from a different location.

Although an organization may attempt to address this problem using jobs which connect to the source system, and run queries to pull out entire data sets or table data across different source and target systems; when the data volumes are high, there is significant latency in this data movement.

Data Capture from Distributed Data Sources

In accordance with an embodiment, described herein is a system and method for capture of change data from a distributed data source system, for example a distributed database or a distributed data stream, and preparation of a canonical format output, for use with one or more heterogeneous targets, for example a database or message queue. The change data capture (CDC) system can include support for features such as distributed source topology-awareness, initial load, deduplication, and recovery. A technical purpose of the systems and methods described herein includes determination and communication of changes performed to data at a distributed data source that includes a large amount of data across a plurality of nodes, to one or more target computer systems.

In accordance with an embodiment, the change data capture system includes support for features such as distributed source topology-awareness, initial load, deduplication, and recovery, which enables, for example:

Capture of incremental changes from a distributed data source, for use with heterogeneous targets, for example, databases or message queues.

Automatic deduplication of the data provided by the distributed data source.

Automatic discovery of the distributed source topology, with configurable access to source change trace entity(s); and distributed source topology-awareness that supports dynamic changes to the distributed data source, such as nodes being added or removed.

Support for recovery, so that when a node in the distributed data source system which had been actively providing records becomes unavailable, for example due to failure, a replica node can be selected and a lookup made for the last record processed by the failed node. The capture process itself is tolerant to crash, can recover and automatically reposition itself, without introducing any data loss or duplicate records.

In accordance with an embodiment, generally described, the change data capture system operates to:

Discover the distributed source topology of the cluster. The information about the location of the distributed source change trace entity(s) (e.g., commit logs, database tables, or message queues), or other log information or files on different nodes is retrieved. If the source change trace entity(s) reside on different physical machines, then the process can pull the change trace entity(s) over a network connection to individual nodes. The capture process keeps track of the origination node of the change trace entity(s); and Process source change trace entity(s) from every node and enrich a deduplication cache for every record available in the source change trace entity.

Whenever a new record is processed, the deduplication cache can decide to pass through the record or filter out duplicates. This is advantageous since generally multi-node systems push multiple copies of data from various points or nodes in the cluster.

The deduplication cache is topology-aware, and has the intelligence to accept data from a node which is possibly alive, and tries to ignore data from nodes which are likely down due to network failure or machine shutdown.

The capture process can auto-replay missing data records from a replica including, for example, selecting a replica with the most history, when an active node used for replication goes down. The capture process can also timestamp order the records read from various source nodes on different time zones.

FIG. 1 illustrates a system for capture of change data from a distributed data source, for use with heterogeneous targets, in accordance with an embodiment.

As illustrated in FIG. 1, in accordance with an embodiment, a change data capture system 100, for example an Oracle GoldenGate environment, which can be provided at a computer or computing environment that includes one or more computer resources (e.g., CPU, memory) 102, can be configured to capture change data from a distributed data source 110, for use with one or more targets, for example a database or message queue.

In accordance with an embodiment, the change data capture system can include an extract component 104, for example an Oracle GoldenGate extract component, which can include an extract processor 111; an access module 112, for example an Oracle GoldenGate vendor access module (VAM); an access API 114 that enables communication with the distributed data source, and a change data capture process manager (CDC process manager) 116.

In accordance with an embodiment, the access module can include an access thread 120, and a reader thread 122, for use in accessing records at the distributed data source.

In accordance with an embodiment, the extract component including its CDC process manager can perform one or more of a capture process 117, deduplication process 118, and recovery process 119, as described in further detail below.

In accordance with an embodiment, the distributed data source system, for example a distributed database, distributed data stream, or other distributed data source, can include a plurality of nodes, for example node 150. At the distributed data source, the data write path 160 can include that data is written from memory 162 to disk 172, in the form of a source change trace entity 174 (e.g., in a Cassandra environment, a commit log), and to a memory representation 164 (e.g., in a Cassandra environment, a memory table) that is subsequently flushed 180 to disk, as a stored representation 182.

For example, in a Cassandra environment, data writes are first written to the node's commit log, and then to a memory table. When the memory table is full, it is written to disk as a stored string table. Writes are batched in the memory table until it is full, whereupon it is flushed. This allows writes to be performed using a commit log append. Once flushed, the stored string table files are immutable.

In accordance with an embodiment, the change data capture system performs automatic discovery of a distributed source topology associated with the distributed data source system, and provides access 202 to the source change trace entity(s), e.g., commit logs, at nodes of the distributed data source system.

In accordance with an embodiment, the capture process converts the change data that is read from the distributed data source, into a canonical format output 205, for consumption by the one or more targets.

In accordance with an embodiment, the change data 206 provided as an output can optionally be provided as, or include, for example an Oracle GoldenGate trail information.

In accordance with an embodiment, the one or more targets can be heterogeneous targets 210, here indicated as target system A 212 and target system B 214, examples of which can include one or more of a database, message queue, or other target.

In accordance with an embodiment, the deduplication process provides automatic deduplication of the data provided by the distributed data source. Additionally, the change data capture system can perform automatic discovery of a distributed source topology associated with the distributed data source system, and in the event a node becomes unavailable, perform the recovery process that selects a replica node at which to obtain records.

In accordance with an embodiment, the access module, for example an Oracle GoldenGate vendor access module (VAM), can include a plurality of event classes, which can be used to process events associated with a source change trace entity, and reader or processor classes, which can be used to read and process records associated with a source change trace entity.

In accordance with an embodiment, the CDC process manager can include, or interact with, a position storage 142, deduplication cache 144, and history queue 146.

In accordance with an embodiment, the position storage enables saving of checkpoint information, upon receiving a checkpoint complete event, which can include a global recovery positioning information for one or more nodes, and in environments in which a sequence identifier (ID) is used, a last-used sequence ID.

In accordance with an embodiment, the deduplication cache is built anytime a unique token (e.g., in a Cassandra environment, a partition token) is detected from an extract record from the source system. This will tie the token and source node address. If a source node(s) is shutdown/ crashes, the deduplication cache is updated to remove all the tokens associated with the respective source node. This allows the process to accept records with the same token from another source replica node which is alive. On processing such a record, the deduplication cache is enriched again.

In accordance with an embodiment, if a new source node(s) is added to the distributed data sources, there is a possibility of redistribution of data records to evenly spread the data. This may lead to certain partitions of data being moved across various nodes. The deduplication cache needs to be refreshed and any tokens which are not part of an active node will be purged. This allows the process to accept records for the purged tokens from a new source replica node. On processing such a record, the deduplication cache is enriched again.

In accordance with an embodiment, every time the deduplication cache is modified, it is also committed to a persistent storage. The capture process will always have access to the persisted deduplication cache, even if the capture process restarts after a crash or shutdown.

In accordance with an embodiment, the history queue can include a set of last records read from one or more source nodes.

Figure 2:
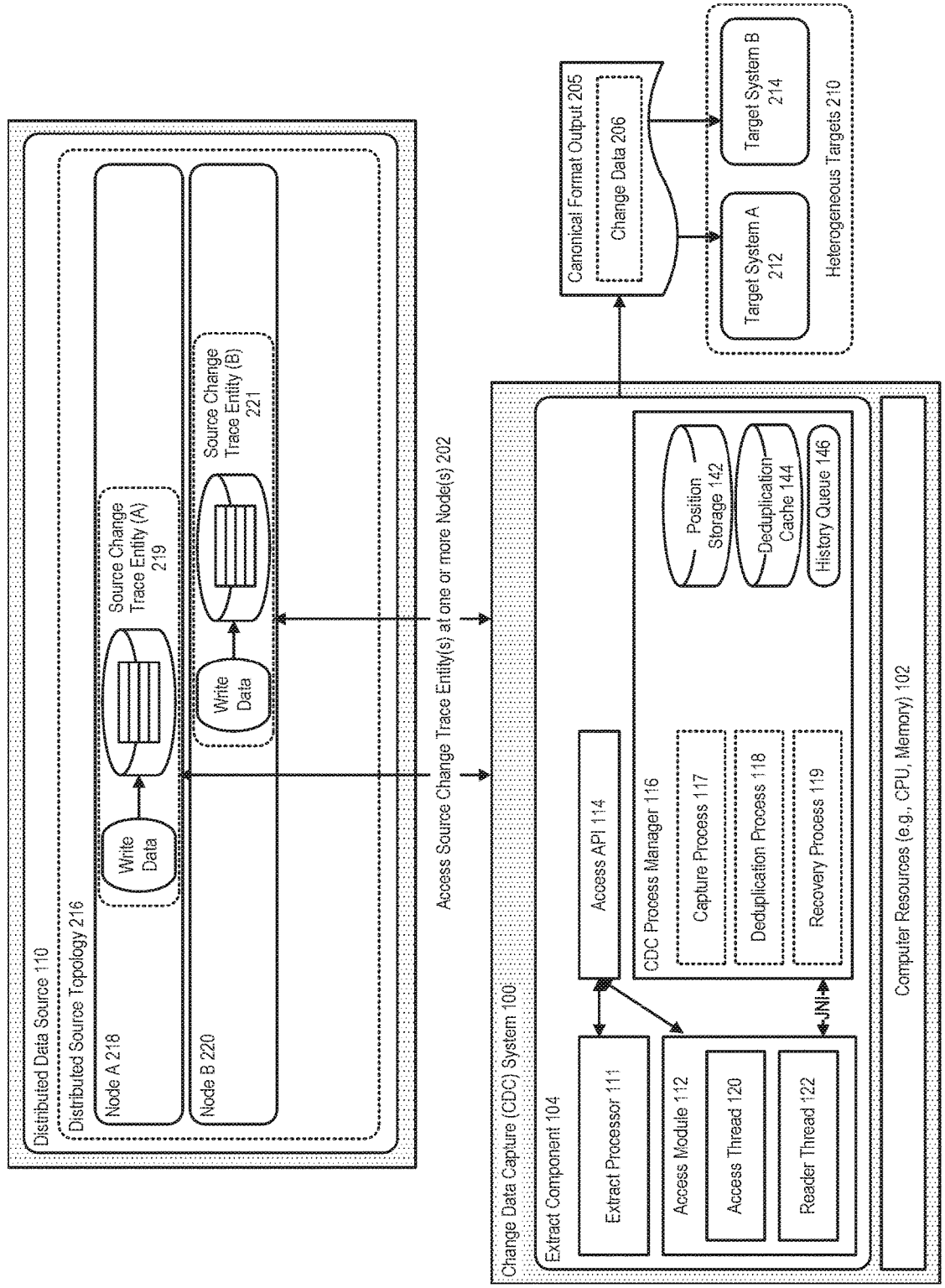
FIG. 2 further illustrates a system for capture of change data from a distributed data source, in accordance with an embodiment.

FIG. 2 further illustrates a system for capture of change data from a distributed data source, in accordance with an embodiment.

As illustrated in FIG. 2, in accordance with an embodiment, the distributed data source system, for example a distributed database, distributed data stream, or other distributed data source system, can include a plurality of nodes arranged within a distributed source topology 216, including in this example node A 218 and node B 220, each of which can be associated with their own source change trace entity 219, 221 respectively. The change data capture system can perform automatic discovery of the distributed source topology associated with the distributed data source system, and provides access to the source change trace entity(s) at the nodes of the distributed data source system.

Figure 3:
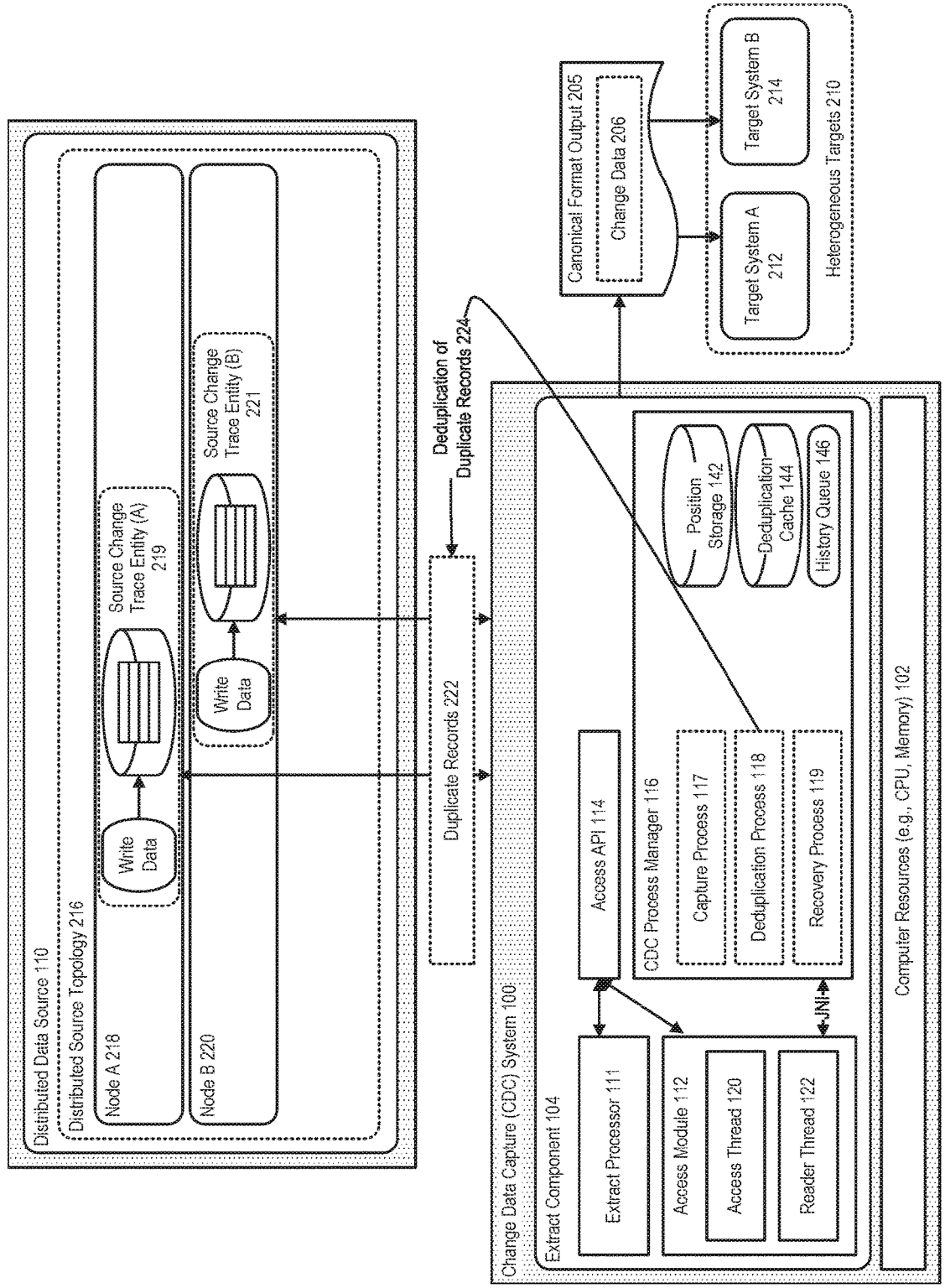
FIG. 3 further illustrates a system for capture of change data from a distributed data source, in accordance with an embodiment.

FIG. 3 further illustrates a system for capture of change data from a distributed data source, in accordance with an embodiment.

As illustrated in FIG. 3, in accordance with an embodiment, upon detection of duplicate records 222 in the change data, the deduplication process can provide 224 automatic deduplication of the data provided by the distributed data source.

Figure 4:
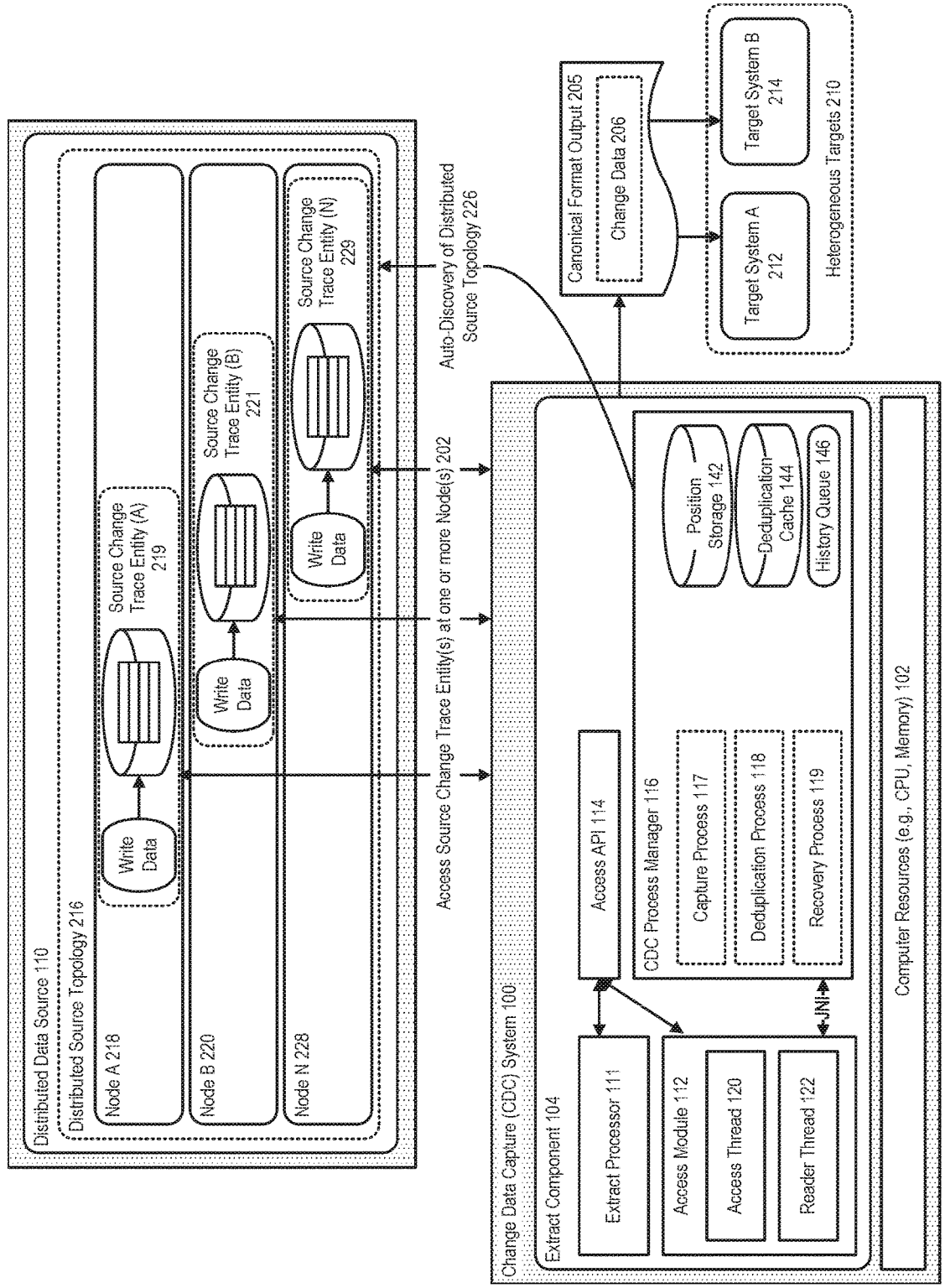
FIG. 4 further illustrates a system for capture of change data from a distributed data source, in accordance with an embodiment.

FIG. 4 further illustrates a system for capture of change data from a distributed data source, in accordance with an embodiment.

As illustrated in FIG. 4, in accordance with an embodiment, the change data capture system can perform automatic discovery 226 of the distributed source topology associated with the distributed data source system, including for example, determine the presence of new nodes, in this example node N 228, together with its source change trace entity 229, within the distributed source topology.

Figure 5:
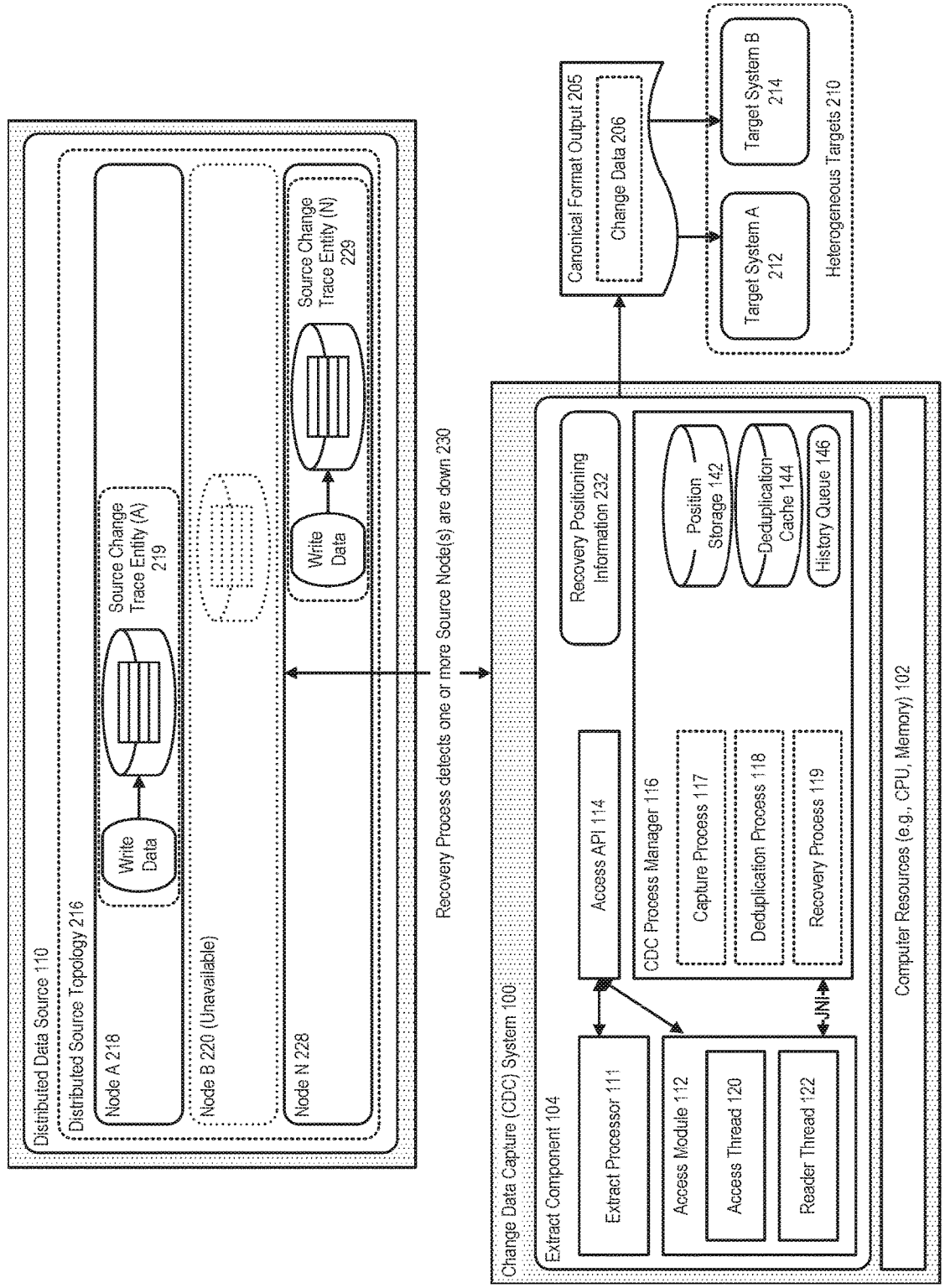
FIG. 5 further illustrates a system for capture of change data from a distributed data source, in accordance with an embodiment.

FIG. 5 further illustrates a system for capture of change data from a distributed data source, in accordance with an embodiment.

As illustrated in FIG. 5, in accordance with an embodiment, the change data capture system can similarly determine if a node becomes unavailable 230, for example node B in this illustration; and respond to this unavailability using a global recovery positioning information 232.

Figure 6:
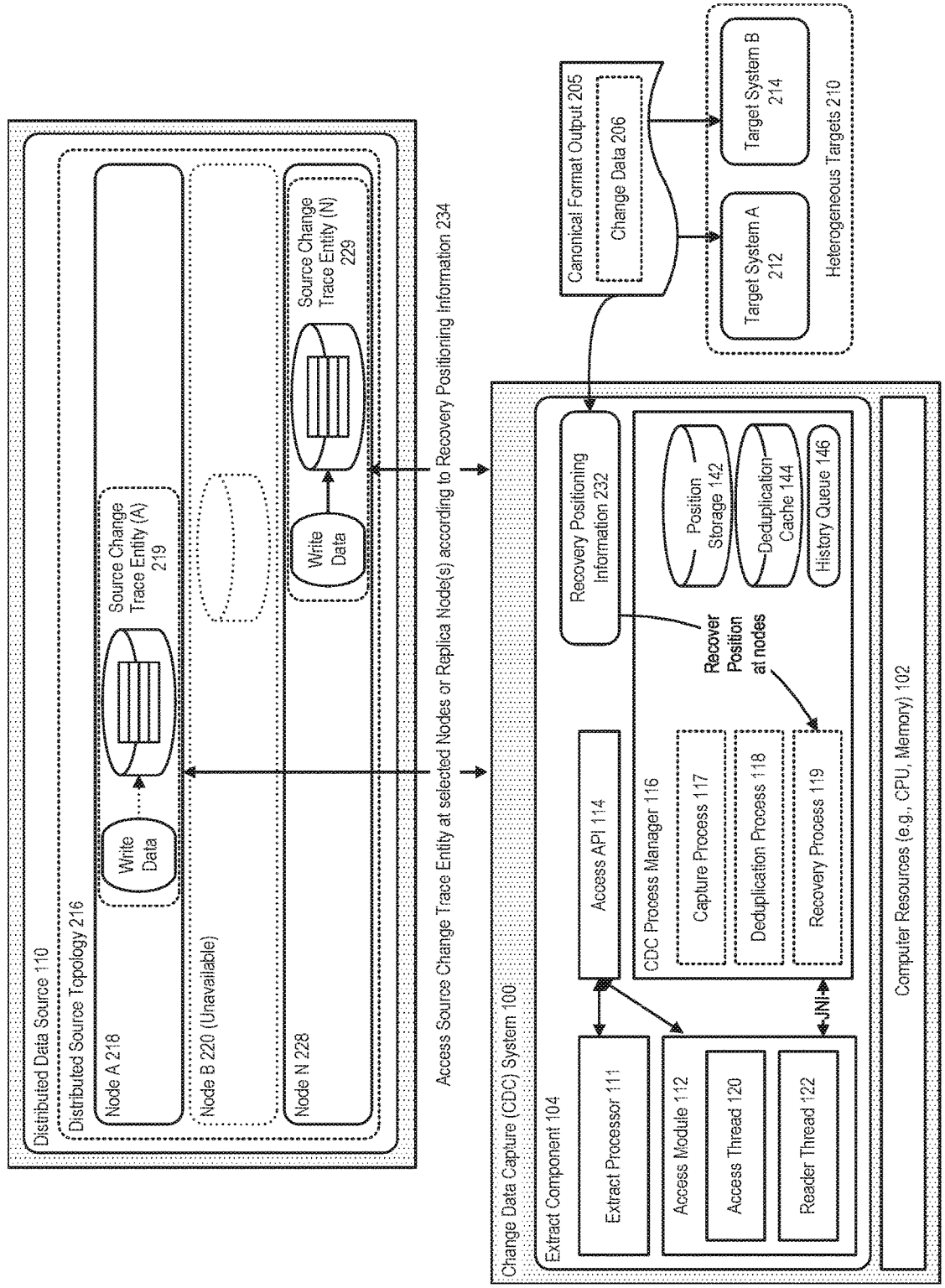
FIG. 6 further illustrates a system for capture of change data from a distributed data source, in accordance with an embodiment.

FIG. 6 further illustrates a system for capture of change data from a distributed data source, in accordance with an embodiment.

As illustrated in FIG. 6, in accordance with an embodiment, in the event a node becomes unavailable, the change data capture system can perform a recovery process that uses the recovery position information to reposition or otherwise select 234 a replica node, in this example node N, at which to obtain records.

Figure 7:
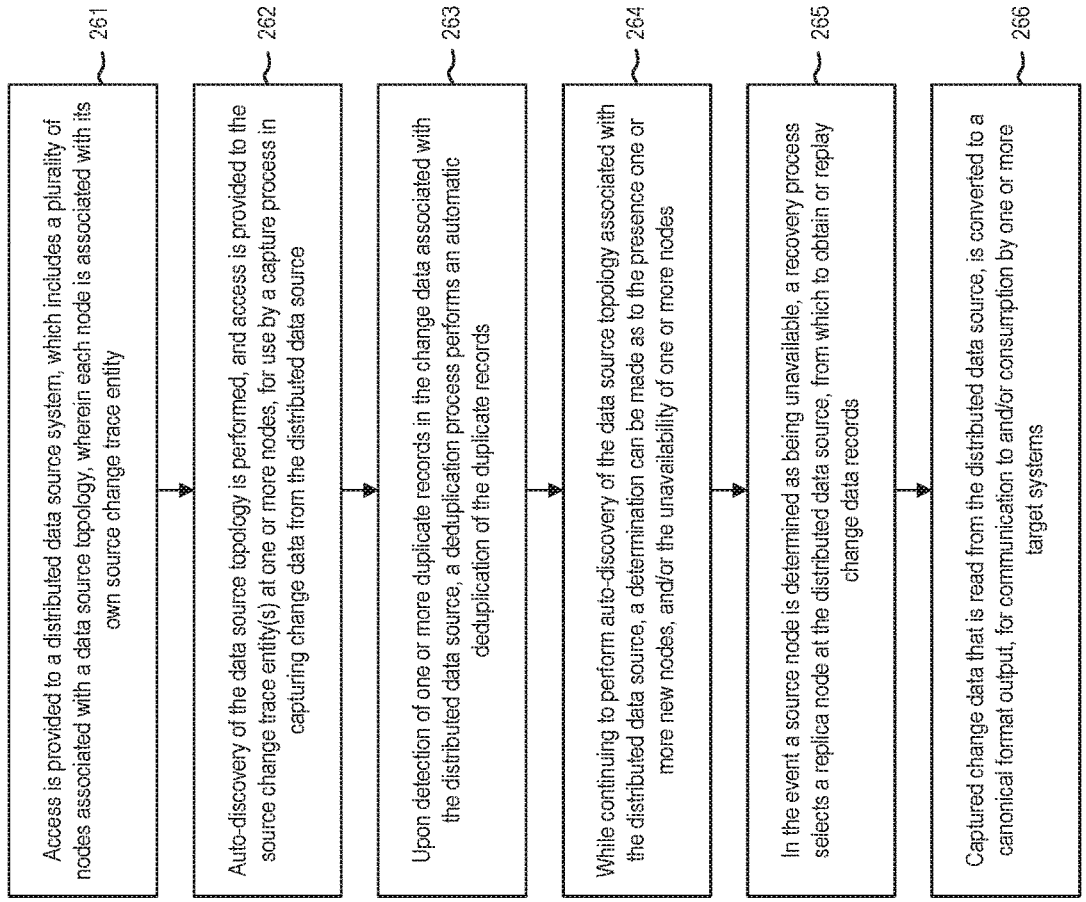
FIG. 7 illustrates a flowchart of a method for capture of change data from a distributed data source, in accordance with an embodiment.

FIG. 7 illustrates a flowchart of a method for capture of change data from a distributed data source, in accordance with an embodiment.

As illustrated in FIG. 7, in accordance with an embodiment, at step 261, access is provided to a distributed data source system, which includes a plurality of nodes associated with a distributed source topology, wherein each node is associated with its own source change trace entity.

At step 262, auto-discovery of the distributed source topology is performed, and access is provided to the source change trace entity(s) at one or more nodes, for use by a capture process in capturing change data from the distributed data source At step 263, upon detection of one or more duplicate records in the change data associated with the distributed data source, a deduplication process performs an automatic deduplication of the duplicate records.

At step 264, while continuing to perform auto-discovery of the distributed source topology associated with the distributed data source, a determination can be made as to the presence of one or more new nodes, and/or the unavailability of one or more nodes.

At step 265, in the event a source node is determined as being unavailable, a recovery process selects a replica node at the distributed data source, from which to obtain or replay change data records At step 266, captured change data that is read from the distributed data source, is converted to a canonical format output, for communication to and/or consumption by one or more target systems.

Additional description describing the above steps are also provided below, in accordance with various embodiments.

Automatic Discovery of Distributed Source Topology and Capture Components

Since distributed data source systems are scalable, they may include many capture components to look for change data. In accordance with an embodiment, the system can auto-discover end-points of change data (for example, a commit log on various nodes in a cluster, or tables on target nodes, or any other source of change data), such that the change data capture process can accommodate distributed source topology changes in the distributed system, including when new components are added, or components are removed, such that the different endpoints may change dynamically during runtime.

For example, in accordance with an embodiment that uses Cassandra, the JARs which are shipped with the binary files provide a NodeProbe class which can be used to retrieve information about the Cassandra cluster (ring). A NodeProbe instance can establish a connection with any node in the cluster; and a single connection to a node enables access to all the required information about the entire cluster.

In accordance with an embodiment, the CDC process manager can register and listen for changes/events, such as, for example: node de-commissioned; node was shut down; new node added; node came up (booted); keyspace added/removed/modified; or table added/removed/modified.

In accordance with an embodiment, when a node is shut down or de-commissioned from the cluster/ring, the CDC process manager can take the following actions: clear the deduplication cache to remove all the tokens associated with this node; find the replica nodes of the node which was removed; find the last record read from the node which went down; find the matching record in any of the replica records; replay records from any replica node which has the maximum record history; update deduplication cache to link the last record's token with the new replica node; and close communication to the node which went down.

Deduplication Process and Filtering of Data from Multiple Replicas

Distributed systems generally include data redundancy, so that they are highly available. In accordance with an embodiment, the change data capture process from such a system can filter out duplicate records, and if needed also apply a timestamp filter.

In accordance with an embodiment, the deduplication process can also accommodate changes in the distributed system distributed source topology. For example, the change capture process can read records from replica node/component when an active component/node which was used to fetch the data record goes down. During deduplication, the change data capture process chooses the data record from a node which feeds the data record first. This way the capture process can read data records from nodes with lower latency.

Figure 8:
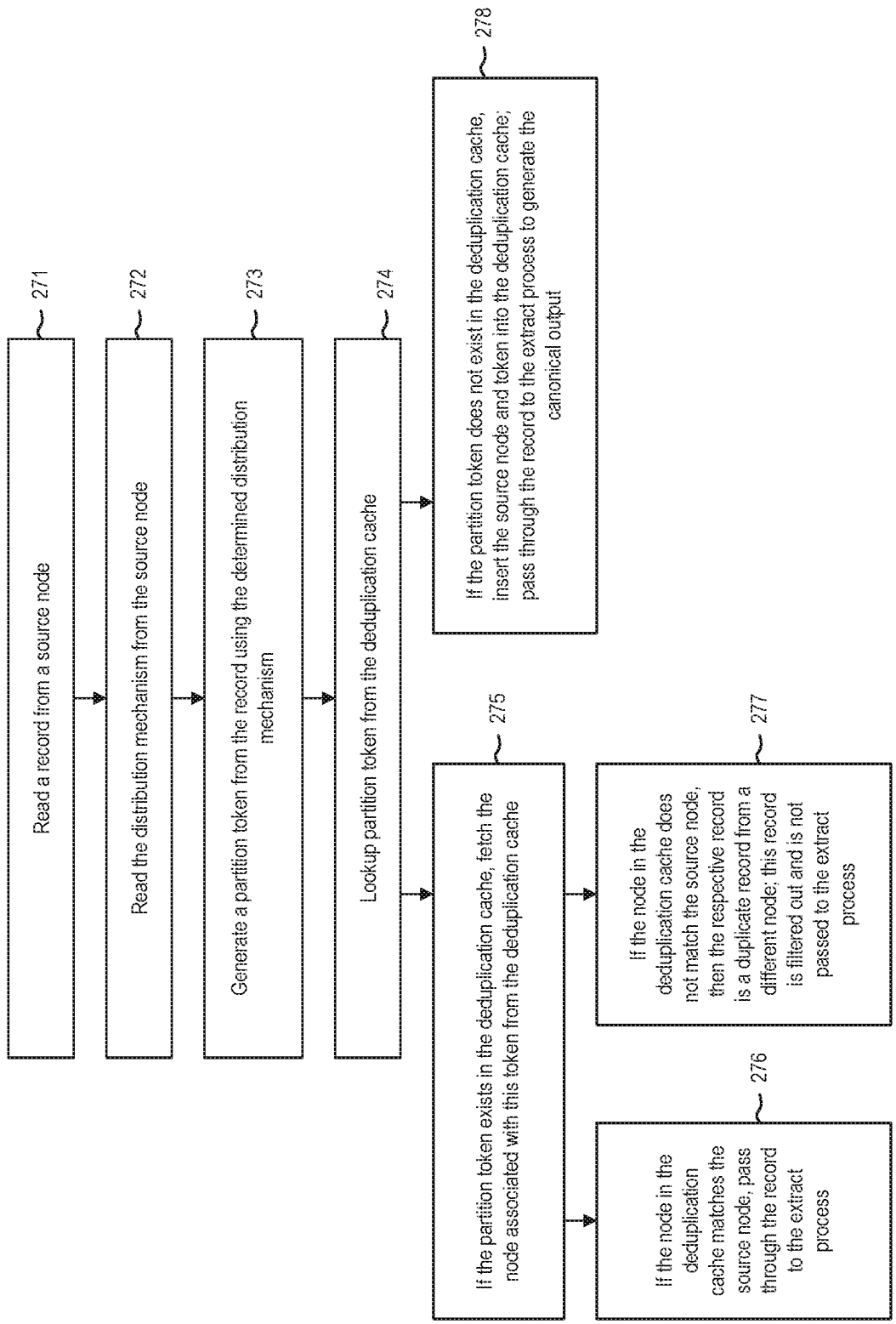
FIG. 8 illustrates a flowchart of a deduplication process, for use with capture of change data from a distributed data source, in accordance with an embodiment

FIG. 8 illustrates a flowchart of a deduplication process, for use with capture of change data from a distributed data source, in accordance with an embodiment.

As illustrated in FIG. 8, in accordance with an embodiment, at step 271, a record is read from a source node.

At step 272, the distribution mechanism (e.g., in a Cassandra environment, a partitioner) is read from the source nodes.

At step 273, a token (e.g., in a Cassandra environment, a partition token) is generated from the record using the determined distribution mechanism.

At step 274, the token is determined from the deduplication cache.

At step 275, if the token exists in the deduplication cache, the node associated with this token is fetched from the deduplication cache.

At step 276, if the node in the deduplication cache matches the source node, the record is passed through to the capture process.

At step 277, if the node in the deduplication cache does not match the source node, then the respective record is a duplicate record from a different node; this record is filtered out and is not passed to the capture process.

At step 278, if the token does not exist in the deduplication cache, the source node and token are inserted into the deduplication cache; and the record passed through to the capture process to generate the canonical format output.

Figure 9:
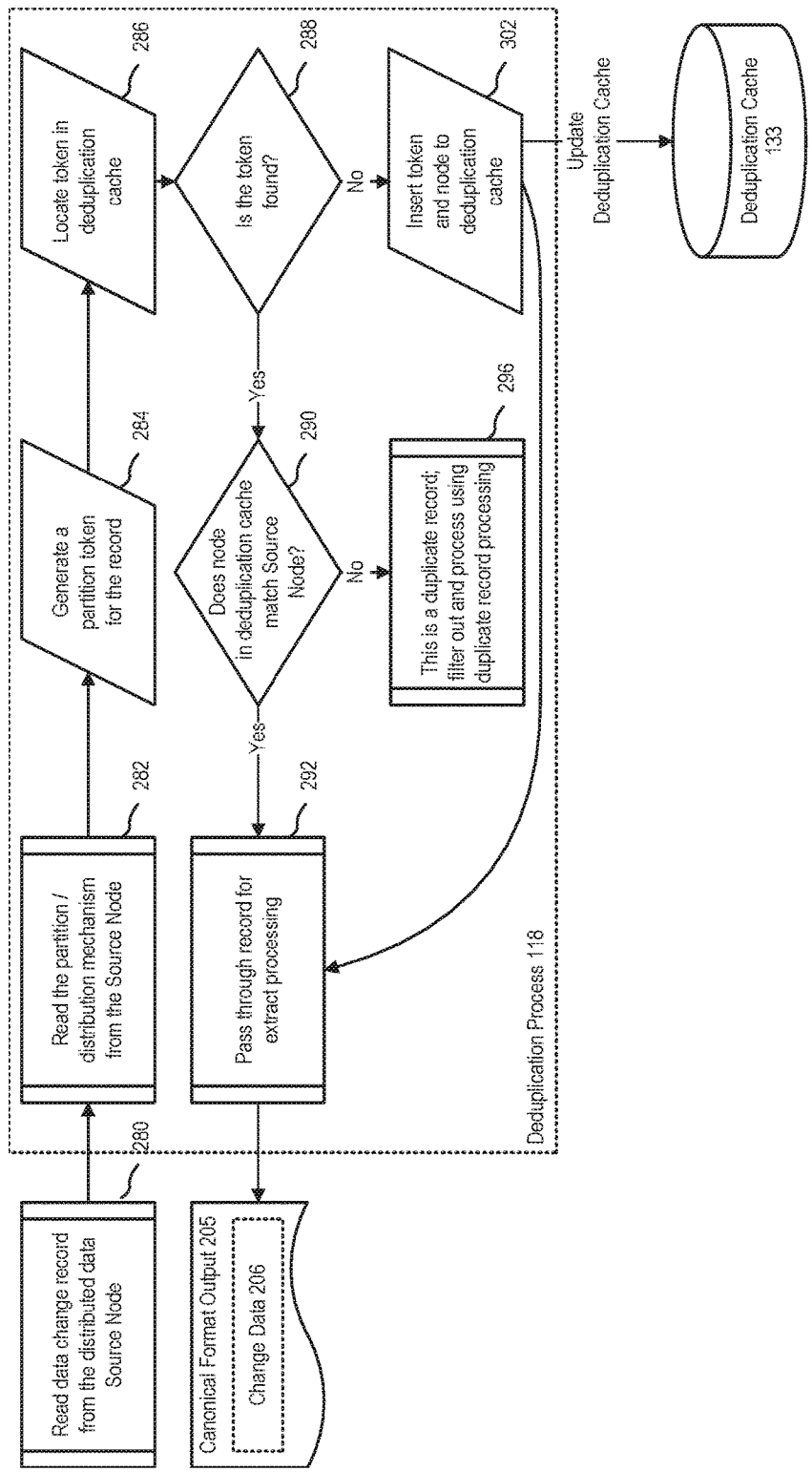
FIG. 9 illustrates a flow diagram of a system for capture of change data from a distributed data source, including a deduplication process, in accordance with an embodiment.

FIG. 9 illustrates a flow diagram of a system for capture of change data from a distributed data source, including a deduplication process, in accordance with an embodiment.

As illustrated in FIG. 9, in accordance with an embodiment, the deduplication process 280-302 shown therein can: read a record from any source node; read the distribution mechanism from the source node; generate a token from the record using the distribution mechanism; and lookup the token from the deduplication cache.

In accordance with an embodiment, if the token exists in the deduplication cache, then the process fetches the node associated with this token from the deduplication cache.

In accordance with an embodiment, if the node in the deduplication cache matches the source node, then the process passes through the record to the capture process.

In accordance with an embodiment, if the node in the deduplication cache does not match the source node, the respective record is a duplicate record from a different node. This record is filtered out and not passed to the capture process.

In accordance with an embodiment, if the token does not exist in the deduplication cache, then the process inserts the source node and token into the deduplication cache; and passes through the record to the capture process to generate the canonical format output.

For example, in accordance with an embodiment for use with a Cassandra environment, the following steps can be performed: When any row for a table is read from the commit log, the CDC process manager generates a partition token for the particular row based on the partition key and also caches the node address of the origin of this row. The partitioner used to generate the partition token is dynamically fetched from the live node. Every record in a distributed source is located in a partition (or an address range or in general storage range) within a node. There could be more than one copy of the record on different nodes. A partition token is generated to indicate a partition within nodes. The partition token generation is performed using a distribution mechanism (e.g., partitioning) associated with the distributed source system. The CDC process manager first fetches information about the partitioning mechanism used by the distributed live source node. The CDC process manager generates a partition token from every record read from the commit log, and builds a cache with association of partition token and node address. When a new row is processed, the CDC process manager checks the cache for a token match. If the token exists in the CDC process manager cache, it checks the origin (node) of source row. If the origin (node) of the source row matches the node in the cache, this row data is passed on. From now on, any new rows for the same partition will be accepted from this node. If the origin (node) of the source row differs the node in the cache, this row is a duplicate and will be filtered out.

In accordance with an embodiment, there is a possibility that nodes may crash/shutdown or be de-commissioned. If a node is down, and the CDC process manager was in the process of reading rows for a particular token from the node which went down, the deduplication cache would have some invalid entries. In this scenario, the CDC process manager will start accepting the same row from a different node. This is accomplished by refreshing the deduplication cache based on the current state of the distributed source topology.

Additionally if the extract component/capture process is stopped and restarted, the deduplication cache is rebuilt at startup to avoid duplicates.

Figure 10:
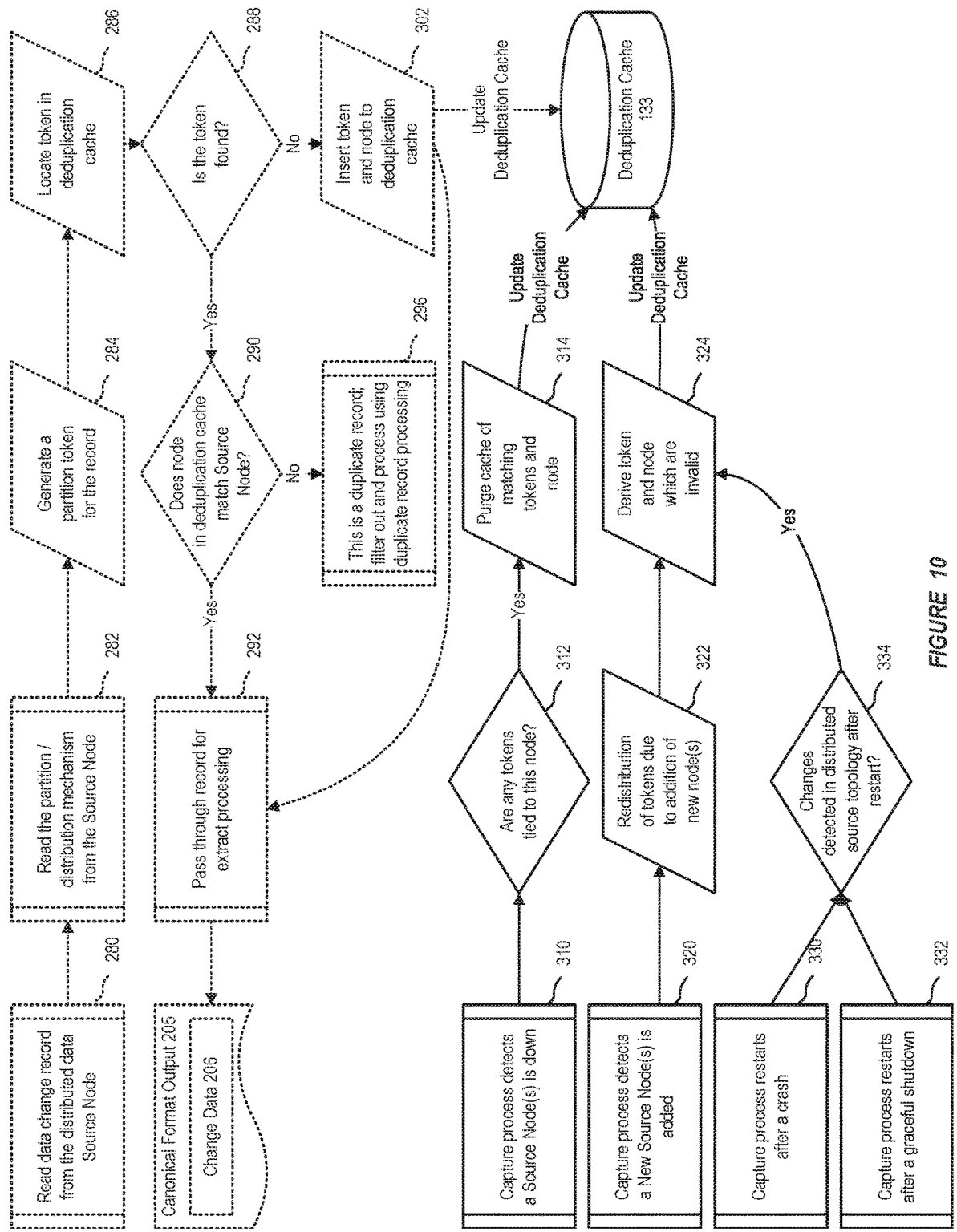
FIG. 10 further illustrates a flow diagram of a system for capture of change data from a distributed data source, in accordance with an embodiment.

FIG. 10 further illustrates a flow diagram of a system for capture of change data from a distributed data source, in accordance with an embodiment.

As illustrated in FIG. 10, in accordance with an embodiment, the processes 310-334 shown therein includes that the cache with token and node mapping are serialized to persistent storage when the extract component/capture process is stopped; and are de-serialized when the extract component/capture process is restarted.

Preparation of Change Data for Use with Heterogeneous Targets

In accordance with an embodiment, the change capture process can convert the data that is read from a distributed system into a canonical format output which can be consumed by any heterogeneous target system. A new target can be supported by introducing a pluggable adapter component to read the canonical change capture data and convert it to the target system format.

In accordance with an embodiment, based on the target system, the canonical format output data record can be transformed to suit the target. For example, an INSERT can be applied as an UPSERT on the target system.

In accordance with an embodiment, the canonical format output can also embed the information about the component/node in the distributed system where the data was captured. In accordance with an embodiment, for example, the system can use an Oracle GoldenGate trail format as a canonical format output.

Typically when a client application reads data from a distributed source system with data redundancy, the client application is only provided with the data record and not the source node (on the distributed system) of the data record. The data record may be fetched by the distributed source system client (e.g., in a Cassandra environment, a CQLSH client) from any of the live nodes. In accordance with an embodiment, the distributed capture application converts the data record into a canonical format output which also has information about the source node which generated this data record.

Change Data Capture Recovery Process

In accordance with an embodiment, when an active node goes down, the capture process can replay records from another replica node automatically from a history cache of replica nodes. This helps avoid possibility of data loss when the capture process switches from one node to another due to distributed source topology change. Even if the capture process crashes abruptly (e.g., due to a kill −9 signal), it can recover and position into the distributed system without data loss.

For example, in accordance with an embodiment that uses Cassandra, when a node which was actively feeding records goes down, a CassandraTopologyManager can select a replica node and lookup the last record which was processed by the node which went down. If there is more than one replica node with a matching record, the replica with the maximum record history is selected to feed the token found in the last record of the node which was shut down.

In accordance with an embodiment, if a matching record is not found in any of the replicas, again the replica with the maximum record history is selected and also a warning message may be logged to indicate a possible data loss. A parameter can be provided to control warning or shutdown action (e.g., ABEND extract action) in this scenario.

Distributed source systems may or may not have a global identifier to indicate a unique position to start reading records. In many cases, it is possible to identify a unique position within every node/component in the distributed system. If the unique positions from all the nodes in a distributed source system are accumulated, this provides a unique position for the entire distributed system.

In accordance with an embodiment, the capture process can restart, recover, and reposition without missing data records, by generating a global restart/recover position for the distributed source system.

Distributed source nodes may have various forms of position information. The capture process can build a unique position adapting to the format of the source node positions.

In accordance with an embodiment, the capture process periodically commits the global position into a position storage that enables saving of checkpoint information, including a global recovery positioning information for one or more nodes, and in those environments in which a sequence identifier (ID) is used, a last-used sequence ID. Committing data to a persistent storage is an expensive operation, and considering performance is important for the capture process, the commit will generally happen at a configurable period, for example N seconds or N minutes. Since the global position is committed at periodic intervals, there is a risk, if the capture process crashes inside the interval window, that the committed global position may not be the latest.

To address this, in accordance with an embodiment, the capture process recovery mechanism is resilient to recovery without data loss and duplicates even in this case by extracting and merging position information for all the nodes from the canonical output component and the position storage component. When a source node(s) is shutdown/crashes, the deduplication cache is updated to remove all the tokens associated with the respective source node. This allows the process to accept records with the same token from another source replica node which is alive. The selection of the new replica node is as follows: The process looks up all the live replica nodes. The process keeps a history cache of the records which were earlier filtered out as duplicates. The process searches the history cache for the last record fed from the source node in the replica nodes, and selects the replica node with a matching record. If there is more than one replica node, the process chooses the replica node with the maximum number of records in the history cache. By replaying records from the replica node, the process is able to gracefully switch from one node to another node without data loss.

In this manner, the system can handle errors at the data source, or within the capture process; and provides resiliency, since the capture process just needs to know the location of the trace entity.

As described above, examples of trace entity(s) include, e.g., in a Cassandra environment, commit logs. The partitioner used to generate the token is dynamically obtained by the reader. Each record in a source can be located at some address range.

In accordance with an embodiment, there can be more than one copy of a record on various nodes. For example, to meet the need for high availability, the same record may be available in three or more nodes. The token can be generated to indicate, for example, a partition within nodes. The recovery process attempts to position within the distributed source, using whichever distribution mechanism the distributed source already uses. For example, Cassandra uses Murmur3 as a distribution mechanism.

Once the extract component receives the record, the distribution mechanism can be determined, by which the system can generate the token for every record in the trace and build the deduplication cache. Generally, this means that all of the records from a bucket at a node will be read from that same node/bucket, in a somewhat sticky manner provided there are no changes in the topology of the distributed source system (e.g., nodes were not added or removed). In accordance with an embodiment:

If a lookup on the node is successful, the record read is passed through.

If the node doesn't match, then we are reading from a new node, and follow the deduplication process.

If there is no token at all, then this is a new node to add to the deduplication cache.

In accordance with an embodiment, a record itself will not indicate which node the data came from. However, the canonical format output (e.g., in a GoldenGate environment, the trail file) will include that information. When the canonical format output is written, the position storage must be updated to show which data came from which node. If there is a crash, the extract component can review the canonical format output, to find which nodes contribute to which records, and then use to the position storage to find out the positions for each node.

In accordance with an embodiment, checkpoints can be written to a checkpoint file such as a JavaScript Object Notation (JSON) file, which includes information associated with the checkpoint, and which is updated on a period basis. A checkpoint event updates the position storage accordingly.

In accordance with an embodiment, during the recovery scan, the extract component can determine each position associated with the nodes, using the information provided by the canonical format output, to determine a global recovery positioning information for the nodes; and can then restart with those positions.

In accordance with an embodiment, during recovery, if duplicate records are received from the nodes, they are not discarded immediately, but are instead placed in the history queue for a period of time, for use during recovery. A record match can be performed against the history queue to determine which record to position to, for that token.

Figure 11:
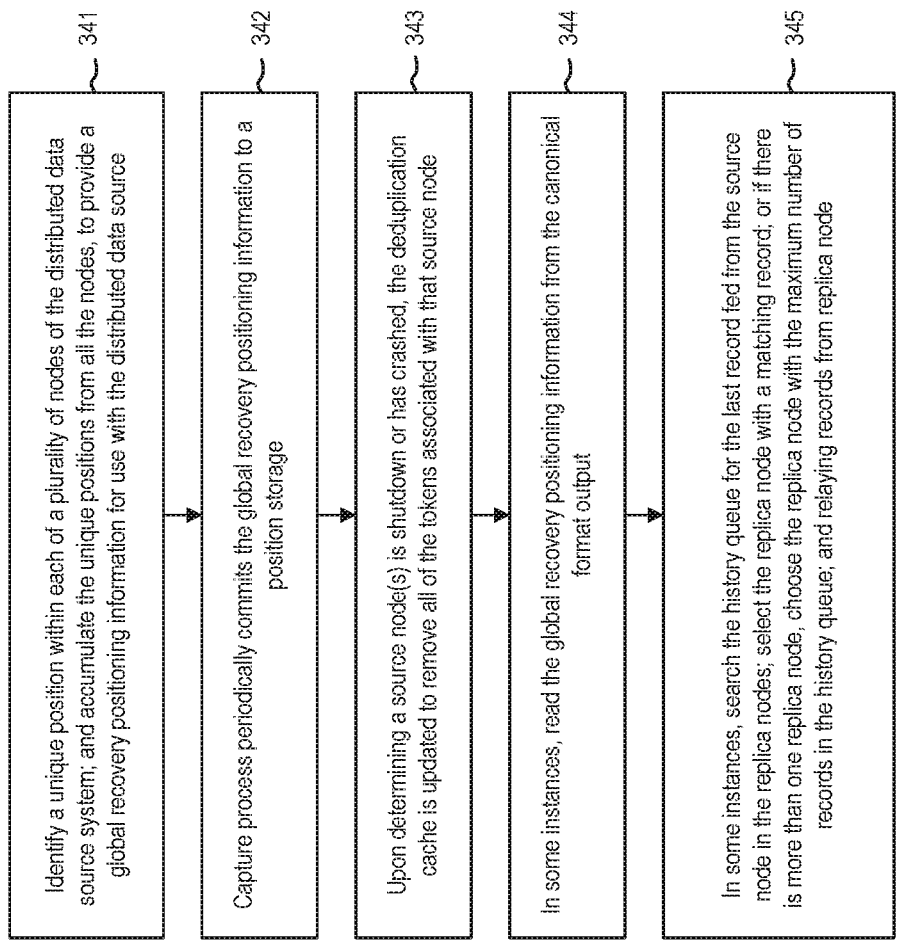
FIG. 11 illustrates a flowchart of a recovery process, for use with capture of change data from a distributed data source, in accordance with an embodiment.

FIG. 11 illustrates a flowchart of a recovery process, for use with capture of change data from a distributed data source, in accordance with an embodiment.

As illustrated in FIG. 11, in accordance with an embodiment, at step 341, a unique position is identified within each of a plurality of nodes of the distributed data source system; and accumulate the unique positions from all the nodes, to provide a global recovery positioning information for use with the distributed data source.

At step 342, the capture process periodically commits the global recovery positioning information to a position storage.

At step 343, upon determining a source node(s) is shutdown or has crashed, the deduplication cache is updated to remove all of the tokens associated with that source node.

At step 344, in some instances, the global recovery positioning information is read from the canonical format output.

At step 345, in some instances, the history queue is searched for the last record fed from the source node in the replica nodes; to select the replica node with a matching record; or if there is more than one replica node, choose the replica node with the maximum number of records in the history queue; and relaying records from replica node.

Figure 12:
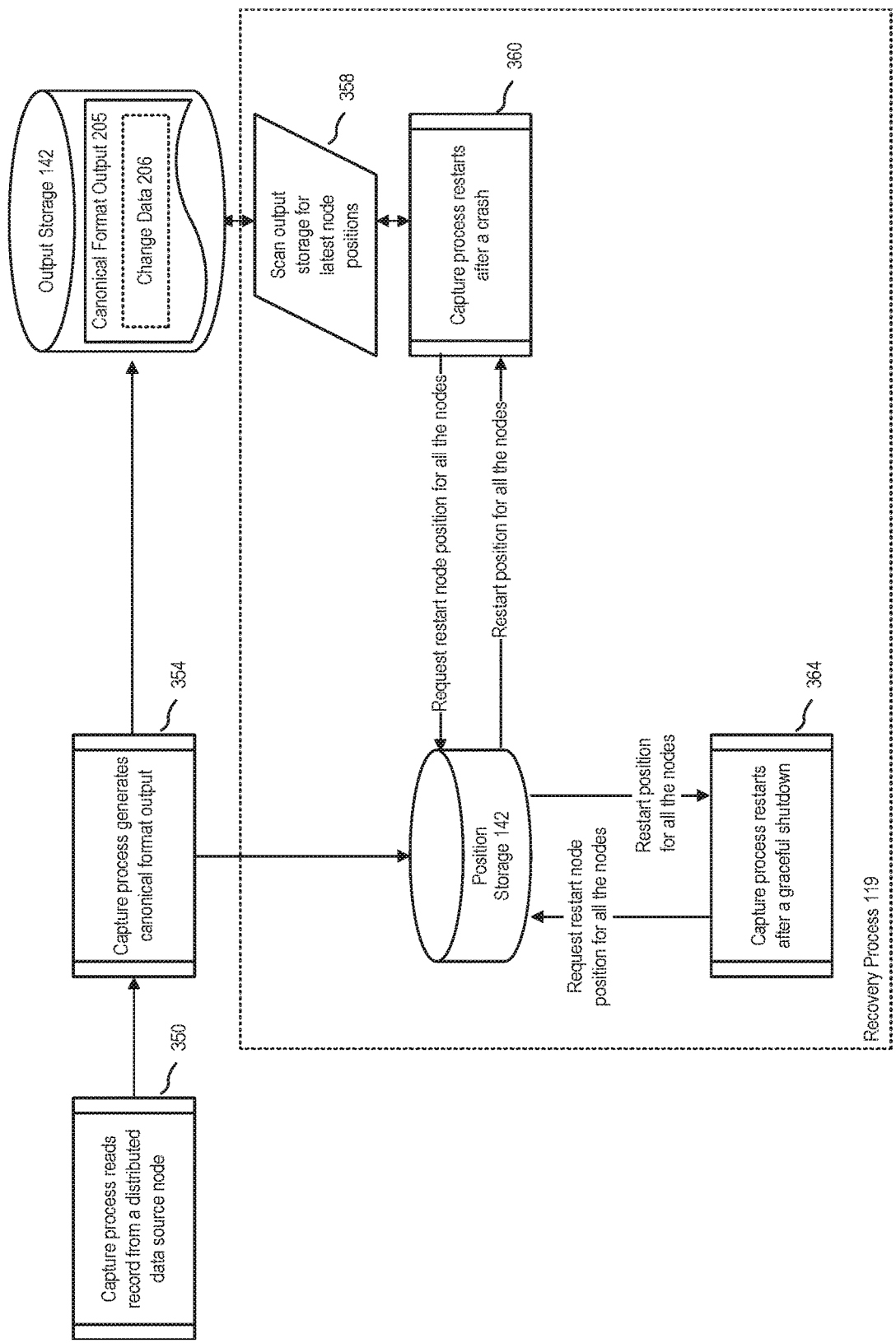
FIG. 12 illustrates a flow diagram of a system for capture of change data from a distributed data source, including a recovery process, accordance with an embodiment.

FIG. 12 illustrates a flow diagram of a system for capture of change data from a distributed data source, including a recovery process 350-364, in accordance with an embodiment.

Additional Deduplication and Recovery Examples (Cassandra)

As described above, in accordance with an embodiment, the system can perform a deduplication process that provides automatic deduplication of the data provided by the distributed data source system.

Figure 13:
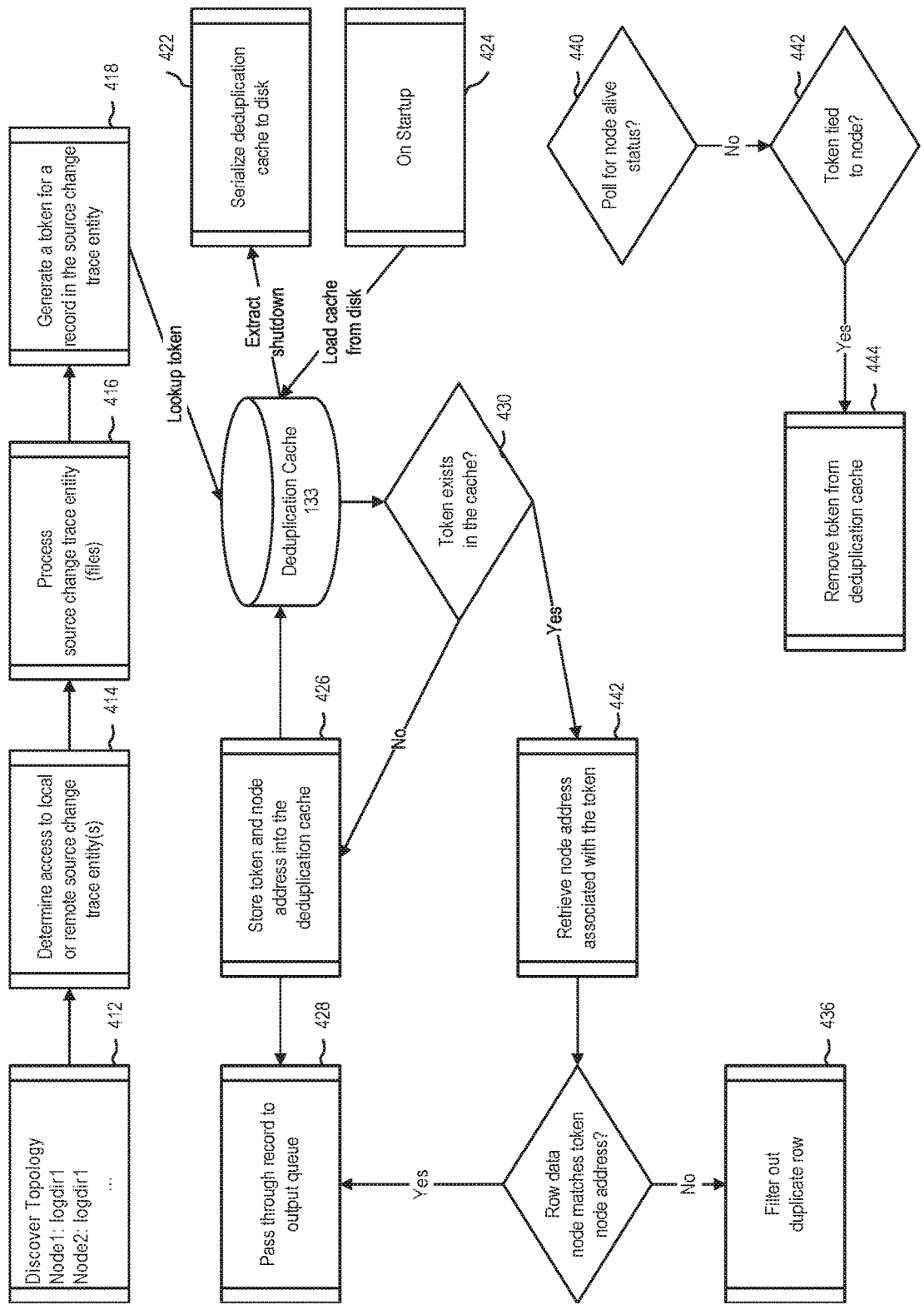
FIG. 13 illustrates a flow diagram of a system for capture of change data from a distributed data source, in accordance with another embodiment.

FIG. 13 illustrates a flow diagram of a system for capture of change data from a distributed data source, in accordance with another embodiment.

As illustrated in FIG. 13, in accordance with another embodiment, such as, for example, a Cassandra database, the deduplication process 412-444 shown therein can be used to provide automatic deduplication of the data provided by the distributed data source.

Figure 14:
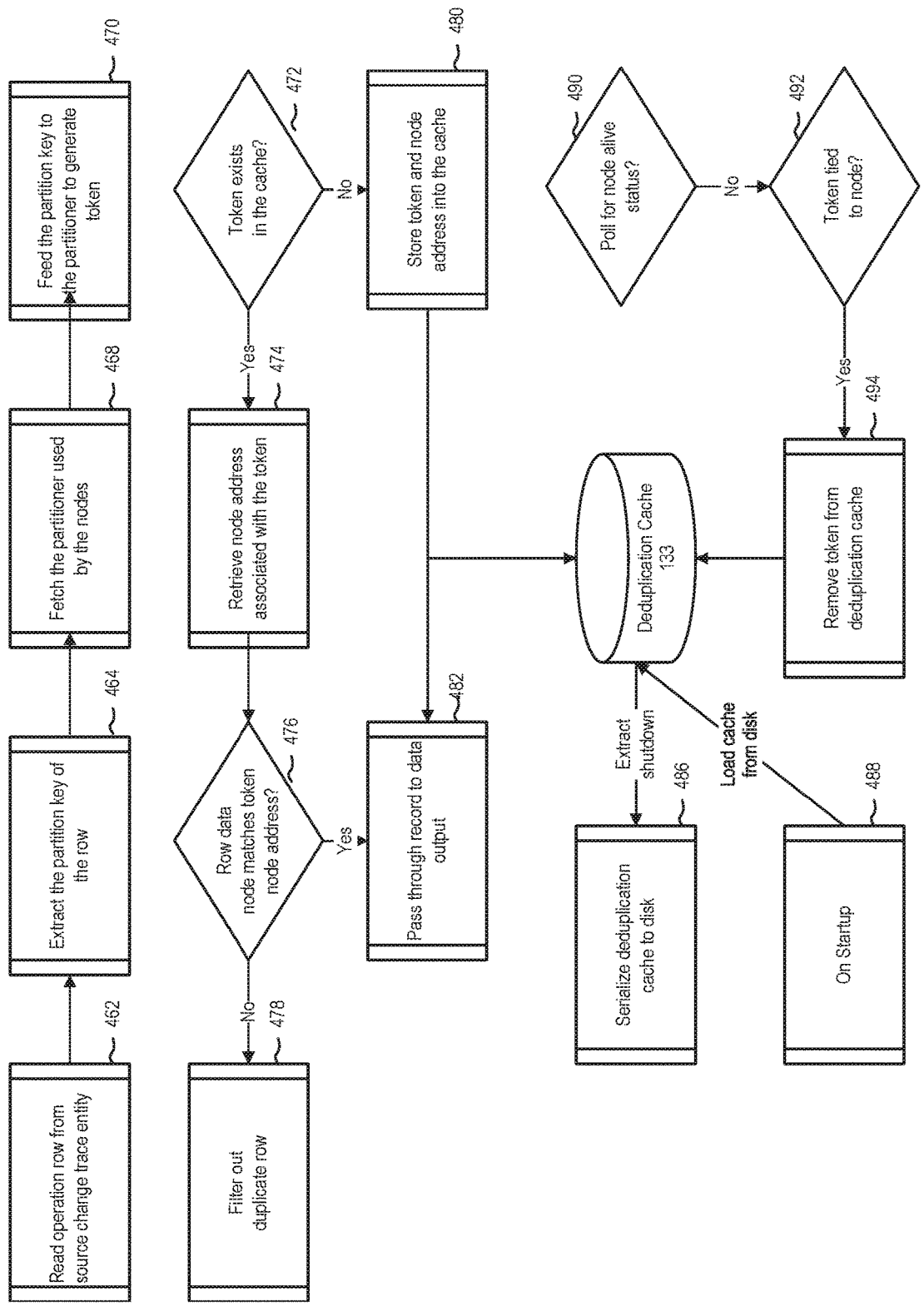
FIG. 14 illustrates a flow diagram of a system for capture of change data from a distributed data source, in accordance with yet another embodiment.

FIG. 14 illustrates a flow diagram of a system for capture of change data from a distributed data source, in accordance with yet another embodiment.

As illustrated in FIG. 14, in accordance with yet another embodiment, the deduplication process 462-494 shown therein can be used to provide automatic deduplication of the data provided by the distributed data source.

In accordance with other embodiments, other types of distributed data sources or databases, or deduplication processes, can be supported. The examples described above are not intended to be restrictive.

Recovery Scenarios

FIGS. 15-18 illustrate examples of recovery scenarios for use with a system for capture of change data from a distributed data source, in accordance with various embodiments.

Although in some of the example recovery scenarios described below, the recovery process considers, for purposes of illustration, the use of a sequence ID, as might be used, for example, with a Cassandra environment. However, the use of such a sequence ID is optional, and with other types of distributed data sources may not be utilized.

Recovery Scenario 1—Checkpoint Update Event (No Crash/Stop)

Figure 15:
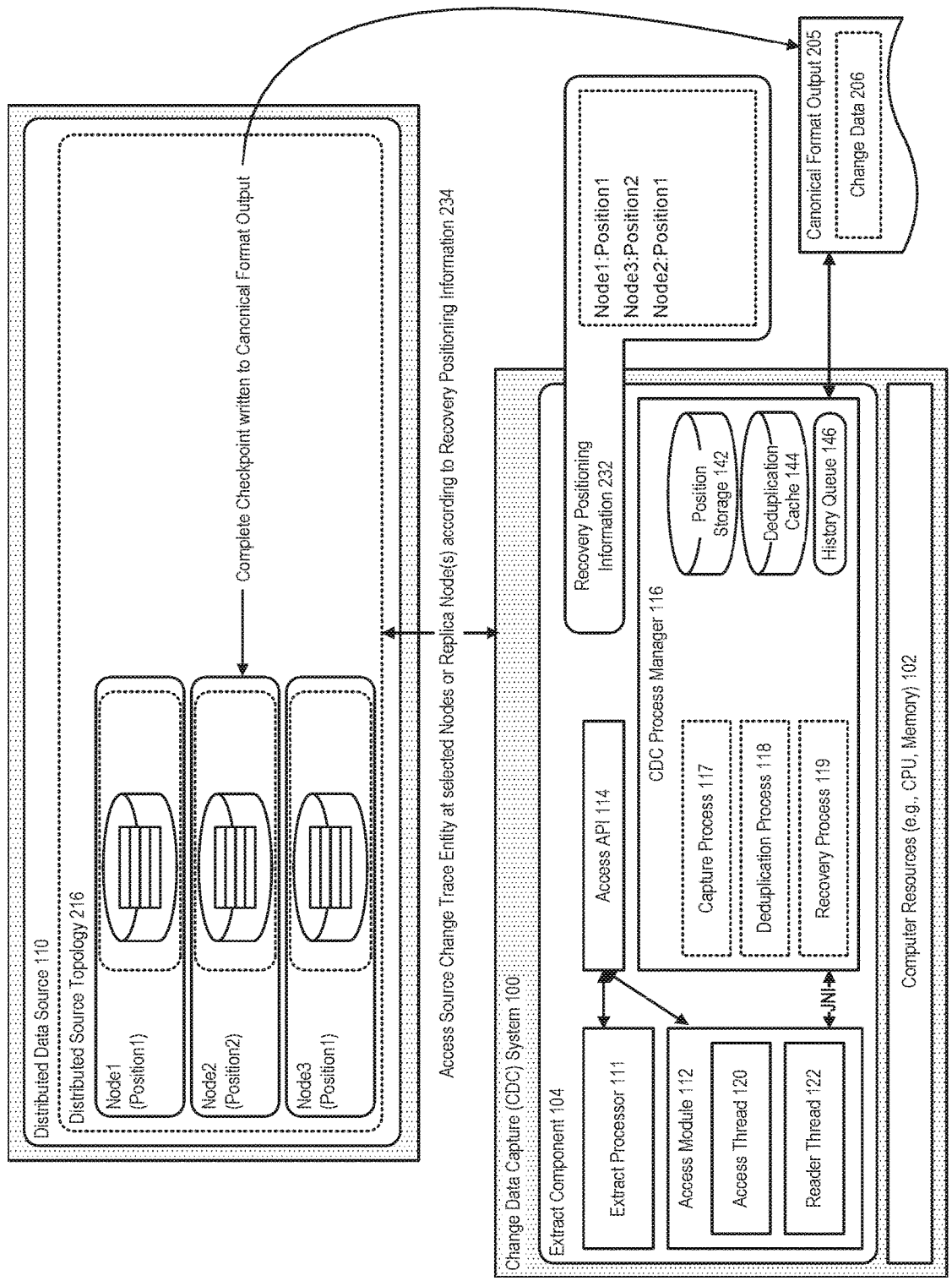
FIG. 15 illustrates an example of a recovery scenario for use with a system for capture of change data from a distributed data source, in accordance with an embodiment.

In accordance with an embodiment illustrated in FIG. 15, in this recovery scenario, upon receiving a checkpoint complete event, the checkpoint information is updated in the position storage, and the tokens are serialized to the canonical format output.

|  | Node1 | Node3 | Node2 | Node3 | Node1 | Node1 |
| --- | --- | --- | --- | --- | --- | --- |
| Sequence ID | 1 | 2 | 3 | 4 (Checkpoint) | 5 | 6 |
| Transaction ID | Node1: Position1 | Node3: Position1 | Node2: Position1 | Node3: Position2 | Node1: Position2 | Node1: Position3 |

If, in this example, there is a checkpoint complete event after writing the record with sequence ID:4 to the canonical format output, the checkpoint information in position storage will include the following global recovery positioning information: Node1:Position1; Node3:Position2; Node2:Position1.

In environments in which a sequence ID is used, the last-used sequence ID:4 can also be stored in the checkpoint information.

Recovery Scenario 2—Graceful Stop and Restart

In accordance with an embodiment, using the previous example, when instead a stop command is issued to the extract component, a checkpoint complete event on the last record is processed.

In this example, the record with sequence ID:6 will trigger the checkpoint information to be written to position storage with its sequence ID value updated to 6. The checkpoint information will be updated with the following positions: Node1:Position3; Node3:Position2; Node2:Position1.

Upon restart, the extract component has all the information in the checkpoint information, to perform an exact positioning onto each of the nodes.

Recovery Scenario 3—Extract Crash and Restart

Figure 16:
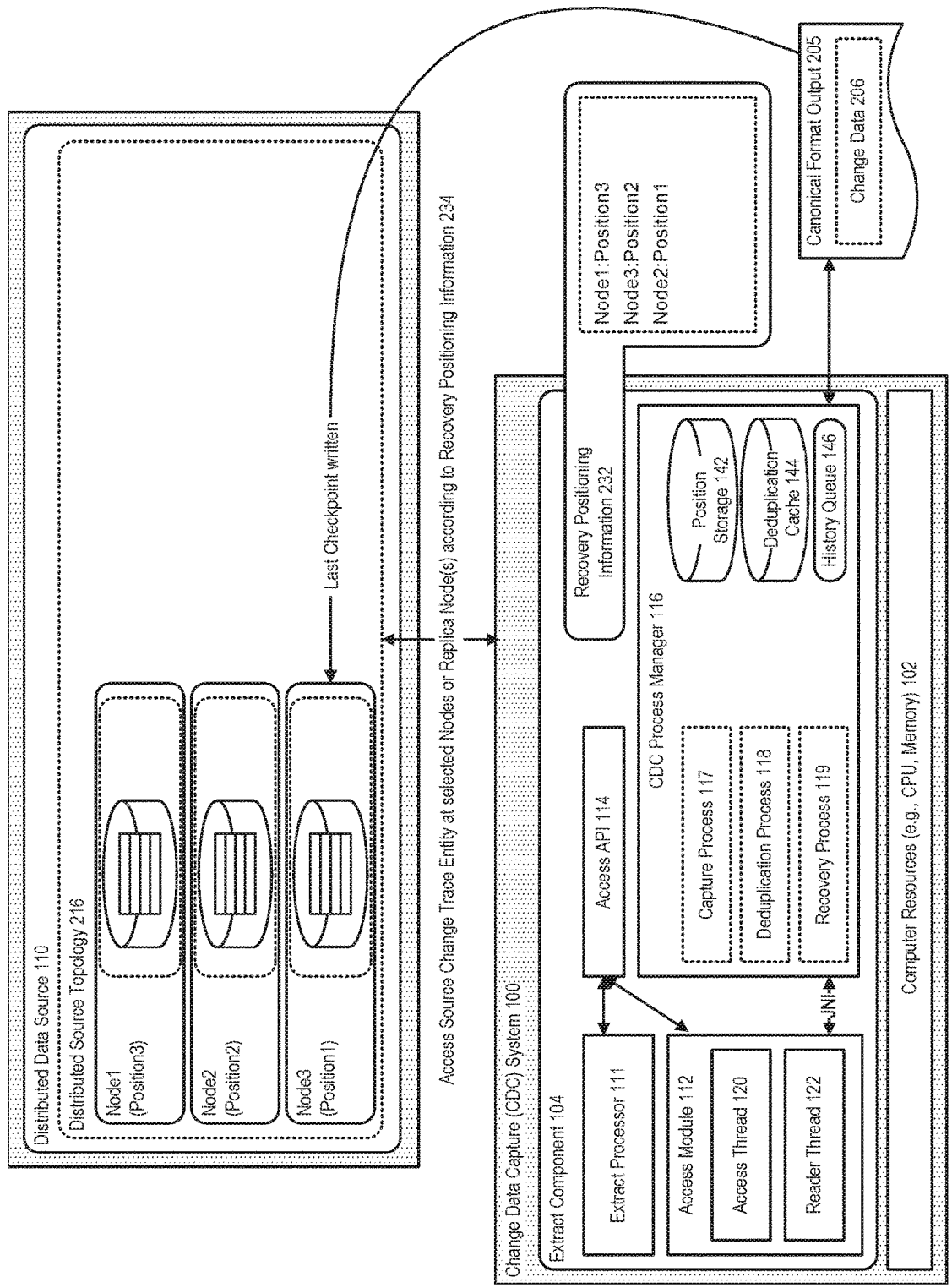
FIG. 16 illustrates another example of a recovery scenario for use with a system for capture of change data from a distributed data source, in accordance with an embodiment.

In accordance with an embodiment illustrated in FIG. 16, in this recovery scenario, on checkpoint event, the checkpoint information written to position storage has: Sequence ID:2; Node1: Position1; Node3: Position1.

|  | Node1 | Node3 | Node2 | Node3 | Node1 | Node1 | Node3 |
| --- | --- | --- | --- | --- | --- | --- | --- |
| Sequence ID | 1 | 2 (Checkpoint) | 3 | 4 | 5 | 6 | Partial record in canonical format output. |
| Transaction ID | Node1: Position1 | Node3: Position1 | Node2: Position1 | Node3: Position2 | Node1: Position2 | Node1: Position3 |  |

In accordance with an embodiment, if the extract component is killed abruptly while writing the record with sequence ID:7, then the last record saved in the canonical format output will be a partial record.

In accordance with an embodiment, upon restart, the following actions will be performed: scan the canonical format output forward from the last check-pointed position that is the record with the sequence ID:2; accumulate the node positions from the transaction ID token in the canonical format output; and store the last seen transaction ID token per node: Node1:Position3; Node2:Position1; Node3:Position2.

In this example, during the scan, the last-used sequence ID from the canonical format output is 6. The extract component will pass on the sequence ID and the node positions, so that the global recovery positioning information will be: Sequence ID:6; Node1:Position3; Node2:Position1; Node3:Position2.

Recovery Scenario 4—Distributed Source Topology Changes

Figure 17:
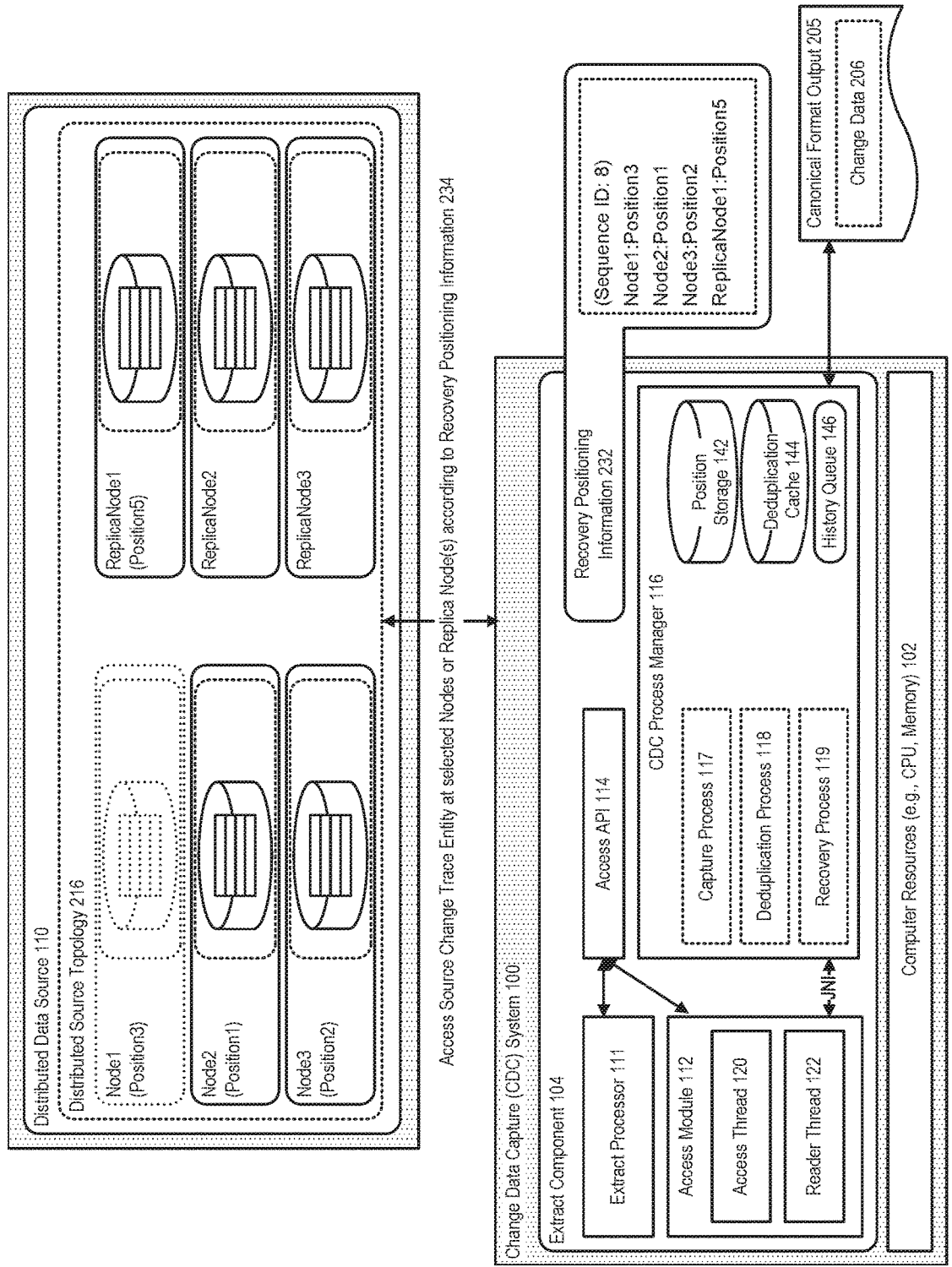
FIG. 17 illustrates another example of a recovery scenario for use with a system for capture of change data from a distributed data source, in accordance with an embodiment.

In accordance with an embodiment illustrated in FIG. 17, if in this example, Node1 is associated with a replica node ReplicaNode1; and a checkpoint event occurs after processing the record with sequence ID:6, then the current position of the extract component will be: Sequence ID:6: Node1: Position3; Node2:Position1 Node3:Position2.

|  | Node1 | Node3 | Node2 | Node3 | Node1 | Node1 |
|---|---|---|---|---|---|---|
| Sequence ID | 1 | 2 | 3 | 4 | 5 | 6 |
| Transaction ID | Node1: Position1 | Node3: Position1 | Node2: Position1 | Node3: Position2 | Node1: Position2 | Node1: Position3 |

Node1 Down—Scenario 1

In accordance with an embodiment using the above example, when Node1 goes down, the extract component will look for a replica node of Node1. It will find ReplicaNode1, and from now on, all the tokens which were fed from Node1 will now be fed from ReplicaNode1.

In accordance with an embodiment, as part of selection of the new replica node (ReplicaNode1), the extract component will search its history queue for the last record which was fed from Node1, which in this example, was Node1:Position3. Any records which are found in the history queue are replayed into the canonical format output file.

If, in this example, the history for ReplicaNode1 is:

|  | ReplicaNode1 | ReplicaNode1 | ReplicaNode1 | ReplicaNode1 | ReplicaNode1 |
|---|---|---|---|---|---|
| Sequence ID | 4 | 5 | 6 | 7 | 8 |
| Transaction ID | ReplicaNode1: Position1 | ReplicaNode1: Position2 | ReplicaNode1: Position3 (Record match) | ReplicaNode1: Position4 | ReplicaNode1. Position5 |

Then, in accordance with an embodiment, if the last record from Node1 which matched in ReplicaNode1 is the third record, the system will replay records with positions ReplicaNode1:Position4 and ReplicaNode1:Position5. If there was a checkpoint complete event after processing ReplicaNode1:Position5, the positioning information will be: Sequence ID:8; Node1:Position3; Node2:Position1; Node3:Position2; ReplicaNode1:Position5.

In this manner, the extract component can react to the distributed source topology change without duplication of data. On graceful stop and restart, new records will be read from nodes, ReplicaNode1, Node2 and Node3. Any records from Node1 are filtered out (even if the Node1 has booted).

Node1 Down—Scenario 2

In accordance with an embodiment, using the above example, but instead assuming a crash before the extract component can checkpoint the records from ReplicaNode1.

In this example, the same records as above were sent to the extract component from ReplicaNode1; the extract component has crashed; and the canonical format output has the records ReplicaNode1:Position4 and ReplicaNode1:Position5 which were not check-pointed.

In accordance with an embodiment, upon restart, the global recovery positioning information will be: Sequence ID:8; Node1:Position3; Node2:Position; Node3:Position2; ReplicaNode1:Position5; which means that, if Node1 is down, the records will be fed from ReplicaNode1, and since we have the position for ReplicaNode1, there will be no duplication of data.

Upon restart, if both Node1 and ReplicaNode1 are up, Node1 would continue feeding records after position ReplicaNode1:Position5 and there will be no duplication of data.

Upon restart, if ReplicaNode1 is down and Node1 is up, Node1 will start feeding the records to the extract component by positioning itself to Node1:Position3. This means that the records which were read earlier from ReplicaNode1: Position5 (with sequence ID:7 and ID:8) will remain as duplicate records in the canonical format output.

Node1 Down—Scenario 3

In accordance with an embodiment, using the above example, but instead that extract component has crashed before records were written to the canonical format output.

In accordance with an embodiment, upon restart, the extract positioning would be: Sequence ID:8; Node1:Position3; Node2:Position1; Node3:Position2.

Upon restart, if Node1 is up, there is no duplication of data.

Upon restart, if Node1 is still down, the extract component starts to read from the replica ReplicaNode1, which may lead to duplication of records, if earlier Node1 has fed these records.

Node1 Down—Scenario 4

Figure 18:
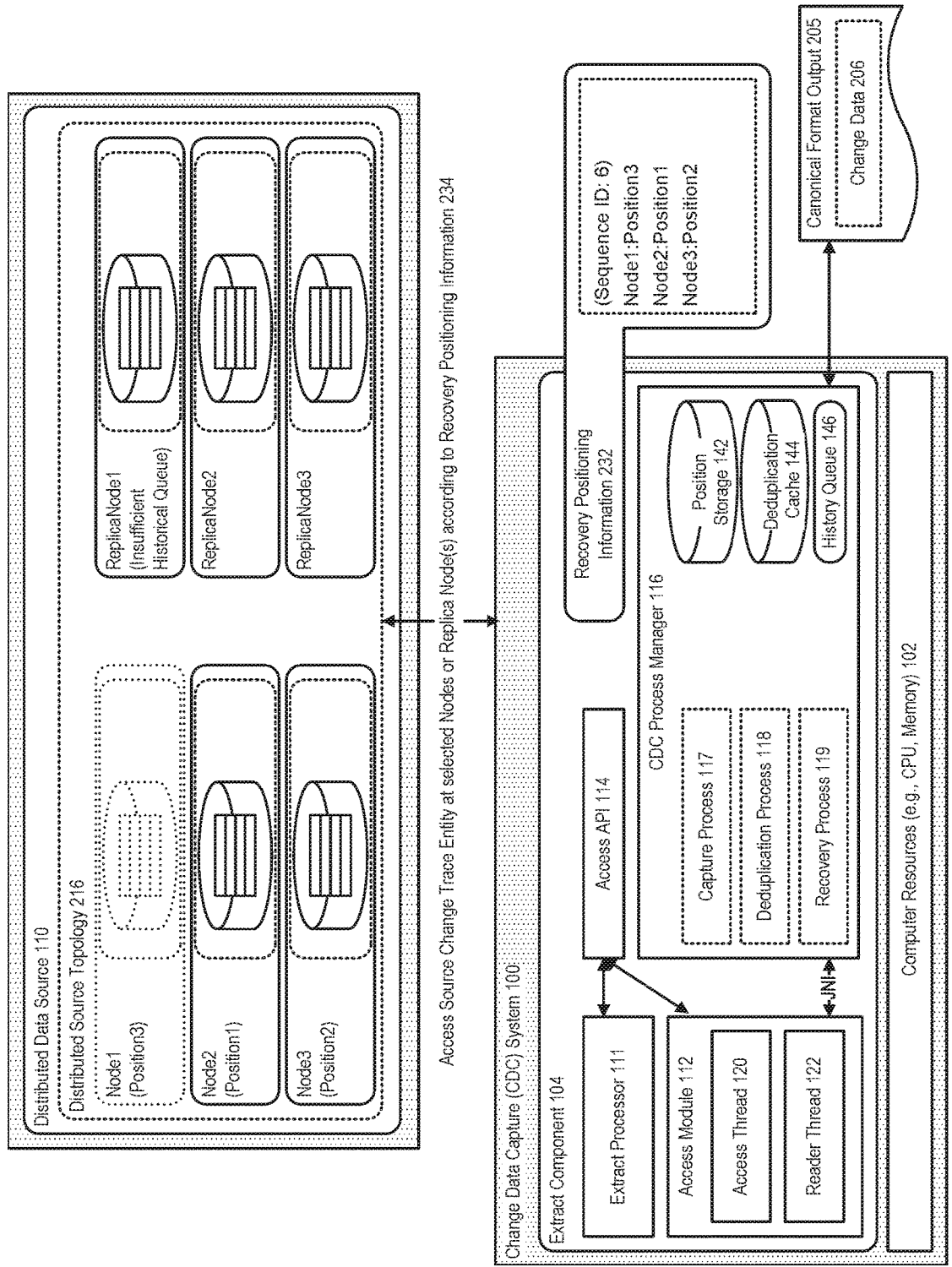
FIG. 18 illustrates another example of a recovery scenario for use with a system for capture of change data from a distributed data source, in accordance with an embodiment.

In accordance with an embodiment illustrated in FIG. 18, in this example ReplicaNode1 does not have enough historical records, for example, the records in the ReplicaNode1 history queue are: ReplicaNode1:Position6; ReplicaNode1:Position7; ReplicaNode1:Position8; ReplicaNode1:Position9.

There is a potential data loss here, since the history queue for ReplicaNode1 is not deep enough. By default, the extract component will ABEND in this scenario, warning the customer about the situation. Alternatively, an administrator can choose to turn off the ABEND feature and restart extract.

In accordance with an embodiment, upon restart the positioning will be: Sequence ID:6; Node1:Position3; Node2:Position1; Node3:Position2. If Node1 is still down, then data will be sourced from ReplicaNode1 starting from its first available source change trace entity; which could lead to duplication of records. If Node1 is up, there will be no duplication of data.

Node1 Down—Scenario 5

In accordance with an embodiment, in this recovery scenario the extract component has processed some records and the global recovery positioning information is: Sequence ID:6; Node1:Position3; Node2:Position1; Node3:Position2.

In accordance with an embodiment, upon restart, if Node1 is down, the extract component will start reading records from the replica node of Node1 that is ReplicaNode1. Since the position information about ReplicaNode1 is not available, all the available records from ReplicaNode1 will be read, which could lead to duplication of records in the canonical format output file.

Example Implementation (Cassandra)

The following section provides, for purposes of illustration, a description of an example embodiment for capture of change data from a distributed data source system, such as, for example, a Cassandra database.

In accordance with other embodiments, other types of distributed data sources or databases can be supported. For purposes of illustration, various details are provided below in order to provide an understanding of various embodiments. However, embodiments can also be practiced without specific details. The following description is not intended to be restrictive.

Cassandra is a massively scalable open source NoSQL database, which delivers continuous availability, linear scalability, and operational simplicity across many commodity servers with no single point of failure. A Cassandra system addresses the problem of failures by employing a peer-to-peer distributed system across homogeneous nodes, where data is distributed among all nodes in a cluster (ring).

In accordance with various embodiments, the system can include or utilize some or all of the following features:

Node: hardware to store data, a member of the cluster.

Datacenter: a collection of related nodes. Using separate datacenters prevents transactions from being impacted by other workloads and keeps requests close to each other for lower latency. Datacenters generally do not span physical locations.

Cluster: a cluster contains one or more datacenters, and can span physical locations.

CommitLog: all data is written first to the commit log for durability (write-ahead logging). After all its data has been flushed to SSTables, commit logs can be archived, deleted, or recycled. If the CDC feature is enabled, the archived (CDC) commit logs reside in the pre-configured CDC directory (default value: $CASSANDRA_HOME/data/cdc_raw) and the active commit logs reside in a pre-configured active log directory (default value: $CASSANDRA_HOME/data/commitlog). Every node has its own copy of commit logs.

SSTable: a sorted string table (SSTable) is an immutable data file to which the system writes memtables periodically. SSTables are append only and stored on disk sequentially and maintained for each table.

MemTable: a memtable is a cache residing in memory which has not been flushed to disk (SSTable) yet.

Gossip: a peer-to-peer communication protocol to discover and share location and state information about other nodes in the ring.

Partitioner: a partitioner determines which node will receive the first replica of a piece of data, and how to distribute data across other replica nodes in the cluster. A partitioner is a hash function that derives a partition token from the primary key of a row. The Murmur3Partitioner is the default partitioner in the latest versions of Cassandra.

Replication factor: the total number of replicas of data to be stored across the cluster.

Replica placement strategy: Cassandra stores copies (replicas) of data on multiple nodes to ensure reliability and fault tolerance. A replication strategy determines which nodes to place replicas on.

Keyspace: a keyspace is similar to a schema in the RDBMS world, and acts as a container for application data. When defining a keyspace, one must specify a replication strategy and a replication factor, for example:

```
CREATE KEYSPACE ks_rep3
WITH REPLICATION =
{'class':'SimpleStrategy','replication_factor':3);
```

Snitch: a snitch defines groups of machines into datacenters and racks (the distributed source topology) that the replication strategy uses to place replicas.

Primary key: a primary key for a table is composed of partition key column(s) and optional clustering key column(s). Partition key columns and clustering columns may have the responsibility to identify a particular row in addition to other duties. Partition key columns are responsible for identifying the nodes where the row needs to fit in. A partitioner is used to generate a partition token (hash value) based on the partition key column in the table. This partition token is mapped to certain node(s) in the cluster. Clustering key columns are used to define the sort order of the data within a node, for example:

```
PRIMARY KEY (col1): Partition key column col1; No clustering key column.
PRIMARY KEY ((col1,col2),col3): Partition key columns [col1,col2]; Clustering key column [col3]
```

In accordance with an embodiment, a CDC feature provides a mechanism to tag specific tables for CDC (archival/recovery/backup). The feature can be enabled on a table by setting the table property cdc=true (either when creating the table or by altering it). Additionally the CDC feature must be enabled node-wise by setting the property cdc_enabled: true in the respective node configuration file, cassandra.yaml. Cassandra uses write-ahead logging to ensure recovery. Any changes to the database are first written to a commit log. A copy of the database changes is also retained in-memory, as memtable. The database changes are eventually flushed out of memtables to SSTables. SSTables are files on disk which is the persistent database storage.

In accordance with an embodiment, Cassandra writes database changes grouped as commit log segments into commit logs under the active commit log directory. When the CDC feature is enabled on the node as well as the table in context, after Cassandra flushes memtables out to SSTables (disk), the commit log segments in the active commit log are written (archived) to a CDC commit log directory. Reading commit log segments from the CDC commit log directory and the active log directory will provide the complete history of database changes. CDC can be enabled or disabled through the cdc table property, for example:

```
CREATE TABLE foo (a int, b text, PRIMARY KEY(a)) WITH cdc=true;
ALTER TABLE foo WITH cdc=true;
ALTER TABLE foo WITH cdc=false;
```

The following parameters are available in cassandra.yaml for CDC:

cdc_enabled (default: false): Enable or disable CDC operations node-wide.

cdc_raw_directory (default: $CASSANDRA_HOME/ data/cdc_raw): Destination for CommitLogSegments to be moved after all corresponding memtables are flushed.

cdc_free_space_in_mb: (default: min of 4096 and one-eighth the volume space): Calculated as sum of all active CommitLogSegments that permit CDC+ all flushed CDC segments in cdc_raw_directory.

cdc_free_space_check_interval ms (default: 250): When at capacity, the frequency with which the space taken up by cdc_raw_directory is limited to prevent burning CPU cycles unnecessarily. Default is to check 4 times per second.

Cassandra processes data at several stages on the write path, starting with the immediate logging of a write: logging data in the commit log; writing data to the memTable; flushing data from the memTable; and storing data on disk in SSTables.

Data in the active commit log is purged after its corresponding data in the memtable is flushed to an SSTable. Any database operation is first written to the active commit log followed by a copy in the memtable. Data in the active commit log is persisted until the memtable flushes it to SSTable. A memtable flush can occur in the following scenarios:

The parameters memtable_heap_space_in_mb (typically one-quarter that of the heap size), memtable_offheap_space_in_mb (typically one-quarter of the heap size) and memtable_cleanup_threshold determine the memtable flush frequency.

memtable_heap_space_in_mb: The amount of on-heap memory allocated for memtables.

memtable_offheap_space_in_mb: Sets the total amount of off-heap memory allocated for memtables.

memtable_cleanup_threshold: Defaults to 1/(memtable_flush_writers+1)

In accordance with an embodiment, Cassandra adds memtable_heap_space_in_mb to memtable_offheap_space_in_mb and multiplies the total by memtable_cleanup_threshold to get a space amount in MB. When the total amount of memory used by all non-flushing memtables exceeds this amount, Cassandra flushes the largest memtable to disk.

A larger value for memtable_cleanup_threshold means larger flushes, less frequent flushes and potentially less compaction activity, but also less concurrent flush activity, which can make it difficult to keep your disks saturated under heavy write load.

The parameter commitlog_segment_size_in_mb (default value of 32) determines the size of individual commit log segment (commit log on disk). A commitlog segment may be archived (moved to CDC directory), deleted, or recycled after all its data has been flushed to SSTables. This data can potentially include commitlog segments from every table in the system. A small total commitlog space tends to cause more flush activity on less-active tables.

Cassandra flushes memtables to disk, creating SSTables when the commit log space threshold has been exceeded. When the database is restarted, the active commit logs are archived (moved to the CDC directory). A nodetool flush command can used to manually flush the memtables to SSTables triggering commit logs availability in the CDC directory.

The latency with which CDC data becomes available has a known limitation due to reliance on CommitLogSegments being discarded to have the data available in cdc_raw: if a slowly written table co-habitates a CommitLogSegment with CDC data, the CommitLogSegment won't be flushed until the system encounters either memory pressure on memtables or CommitLog limit pressure. Ultimately, this leaves a non-deterministic element to when data becomes available for CDC consumption unless a consumer parses live CommitLogSegments.

In accordance with an embodiment, to address this limitation and make semi-realtime CDC consumption more friendly to end-users, the system supports the following:

Consumers parse hard links of active CommitLogSegments in cdc_raw instead of waiting for flush/discard and file move.

Cassandra stores an offset of the highest-seen CDC mutation (Mutation) in a separate index (idx) file per commit log segment in cdc_raw. Clients tail this index file, delta their local last parsed offset on change, and parse the corresponding commit log segment using their last parsed offset as min.

Cassandra flags that index file with an offset and DONE when the file is flushed so clients know when they can clean up.

Capture of Cassandra Database Changes

In accordance with an embodiment, the CDC feature provides a mechanism to archive commit log segments into a CDC directory when database changes are flushed out of Memtables (stored in RAM). The table data is grouped as commit log segments which are serialized into a binary format and written to commit logs.

Cassandra JARs (Java Archives) which are packaged as part of the database itself provide an interface CommitLogReadHandler which can be implemented to decode the commit log segments. In accordance with an embodiment, the system can house an implementation of the interface CommitLogReadHandler.

In accordance with an embodiment, advantages of this approach include that reading commit logs for database changes is fast. The capture process (the extract component) can read the commit logs in the CDC directory or the active log directory and capture database changes with very minimal load on the Cassandra database server, it is a non-intrusive capture. The capture process will filter out specific table data when reading the commit logs. This also improves overall capture performance.

In accordance with an embodiment, the capture process can be configured to read database changes from archived (CDC) commit logs as well as active commit logs. Reading active commit logs provides very low latency for capture. The capture process can be stopped and restarted to any valid offset in the commit log. The capture process can be positioned based on timestamp or specific commit log segment offsets within the commit log. The commit logs in the CDC directory are never purged. It is the responsibility of CDC consumer, the capture process to do the necessary house-keeping. This means the capture process may be restarted after extended downtimes and still capture the database changes.

Some considerations for this approach include that commit log read segments do not tag an INSERT or UPDATE source operation. This means the capture process would need to write all the source UPDATE operations as INSERTs (or UPSERTs, as described below) into the trail. Commit log segments do not store TRUNCATE operation. Commit log segments do not store before image of the changed row. Commit log segments house data serialized as Mutation objects. If future versions of Cassandra modify the Mutation object format or APIs, the capture process can be modified accordingly.

Intercepting the Input Query (CQL) at Each Node

In accordance with an embodiment, Cassandra JARs packed with the installation provide an interface QueryHandler which can be implemented to intercept the input user query. The input query from the user is a Cassandra Query Language (CQL) which is similar to SQL.

In accordance with an embodiment, advantages of this approach include that access to all the input queries (CQL) available. The system should also be able recognize UPDATE and TRUNCATE operations. Any changes to Cassandra log segments would not break the functionality of the capture process unless the input CQL syntax does not change.

Some considerations for this approach include that the QueryHandler is an additional layer for input query processing of the Cassandra database process. Any flaw in the QueryHandler could lead to database process crashes or data corruption. The QueryHandler is an intrusive solution which has to be installed at every node in the cluster. Any latency in the QueryHandler is passed on to the Cassandra database input query processing engine and eventually to end users. Input CQL do not have any position information as commit log segments (in the commit logs) are not available in this context. The capture process can build a pseudo position which may be complex or defer extract positioning capability. If the capture process was down, and restarted any database changes during the downtime cannot be read.

In accordance with an embodiment, UPDATE operations can be delivered as INSERTS and delivery (replicat) can use [UPDATEINSERTS+INSERTMISSINGUPDATES]. The system writes a new Database type name as "CASSANDRA" in the trail which will indicate that the INSERT operations in this trail is an UPSERT operation.

Access to Commit Logs

In accordance with an embodiment, a Cassandra cluster typically comprises one more nodes (servers) which together act as one database instance. Commit logs exists on each of the nodes on the cluster. In accordance with an embodiment, options to access the commit logs include, for example:

Access over Local File System

In accordance with an embodiment, the commit logs access on the machine where the extract component is running. This configuration does not involve network costs.

Access to Remote Commit Logs Over NFS (Network File System) Protocol

In accordance with an embodiment, the commit logs should be made available through a NFS mount on the machine where the extract component is running. This configuration does incur network bandwidth to read the commit logs.

Access to Remote Commit Logs Through SFTP

In accordance with an embodiment, the required commit logs are transferred from the remote nodes to the machine where the extract component is running using Secure File Transfer Protocol (SFTP). This configuration also incurs network costs to transfer the files.

Access to Remote Commit Logs Through an Extract-Agent

In accordance with an embodiment, a remote program can be installed on each of the nodes which would have the context of extract TABLE parameters to filter out the required table data from the commit logs. This filtered commit log data should be transferred over the network to the machine where the extract component process is running. The extract component can re-assemble the data from the remote program from all the nodes and proceed with the required processing.

Discovery of Nodes

In accordance with an embodiment, the node discovery by the extract component can include, for example:

Static Configuration

In accordance with an embodiment, the administrator needs to provide the following details for every node in the cluster: List of CDC commit log directories; List of active commit log directory; and List of Cassandra node addresses. The commit log directories may be a local directory or a remote directory mounted over NFS.

Dynamic Configuration

In accordance with an embodiment, the User/Operator to provide the information for just one of the nodes in the cluster. The configuration for a single node may have meta-fields (like $nodeAddress) in the commit log directory path to identify individual node address. Automatically discover all the nodes in the cluster.

Cassandra Extract and CDC Process Manager

In accordance with an embodiment, a Cassandra CDC process manager is a Java application which reads, filters and transforms the raw table data (Mutation) in the commit logs. The transformed commit log data is accessed over Java Native Interface (JNI) by a C++ library. A Cassandra VAM can be provided as a C++/C binary (shared library) which is used by the extract component process to write trail files.

Big Data VAM Module

In accordance with an embodiment, a big data VAM module is a generic VAM module proposed to be re-used for all the big data sources. It handles non-transactional table data. It is multi-threaded; one thread (VAM API thread) interacts with the VAM API; the second thread (JNI reader thread) reads operation records from the respective big data source using JNI. The JNI reader thread acts as the producer for operation records and VAM API thread consumes these operation records. The generic VAM module uses a factory class to instantiate the specific JNI reader implementation based on the source database. The capture process uses the class CassJNIReader to interact with the Java application CDC process manager.

CommitLogReadHandler Interface

In accordance with an embodiment, the Cassandra database process writes any changes to the database into the commit logs. Implementing the CommitLogReadHandler interface enables to read the database changes in the form of Mutation objects.

Decoding Mutation from Commit Logs

In accordance with an embodiment, a class CDCHandlerImpl is the implementation of CommitLogReadHandler interface. The CDCHandlerImpl is provided access to Mutation objects constructed from Commit Log read segments which exist in the commit logs. A class CassandraMutationProcessor has the responsibility of decoding the Mutation objects and transforming it to a format which can be easily accessed over JNI by the Cassandra VAM library. A CassandraMutationProcessor also generates a partition token for every Mutation record from the partitioner which is currently used by the cluster. The partitioner used by the cluster is retrieved dynamically by using NodeProbe on any live node.

Processed Mutations

In accordance with an embodiment, raw Mutation records from the commit log segments are transformed into CassandraCDCMutation object which is the decoded format of the database operation.

Column Definition

In accordance with an embodiment, the column definition extracted out from the Mutation object is stored in a CassandraColumnDefinition class. This class stores the column attributes.

Column Data

In accordance with an embodiment, a class ColumnData encapsulates a single column's data read from the Mutation object.

CassandraTopologyManager

In accordance with an embodiment, this class performs the following tasks on behalf of CassandraCDCProcessManager: Listen/react to distributed source topology changes (node state changes) in the ring. Listen/react to schema changes in the ring. Maintain a deduplication cache to de-dup rows from replicas. Recover from node failure by replaying records from a history cache. Manage position/checkpoint information through ClusterPosition. Access keyspace and table metadata through SchemaLoader. Instruct the embedded SFTP client CassandraClusterSFTPClient for remote access of the commit logs.

NodeProbe

In accordance with an embodiment, the JARs which are shipped with Cassandra binary (installation tar) provide a NodeProbe class which can be used to retrieve information about the ring. NodeProbe instance can establish a connection with any node in the cluster. A single connection to a node is good enough to access all the required information about the cluster.

Partitioner and Partition Tokens

In accordance with an embodiment, NodeProbe is used to retrieve the partitioner used by a live node. Every node in the cluster is assigned a range of partition tokens (hash values). When the replication factor of keyspaces are greater than one, a partition token value may point to more than one node in the cluster. The partitioners use a specific hashing algorithm to generate the partition token value. The recent versions of Cassandra uses a Murmur3 partitioner to generate partition tokens.

Deduplication of Row Data from Replicas

In accordance with an embodiment, when capture is enabled on source tables which reside in a keyspace with a replication factor greater than one, the CDC process manager will be presented with more than one copy of the same row, and can filter out duplicate rows from the replicas. The following are the steps performed by CDC process manager for deduplication:

In accordance with an embodiment, when any row for a table is read from the commit log, CDC process manager generates a partition token for the particular row based on the partition key and also caches the node address of the origin of this row. The partitioner used to generate the partition token is dynamically fetched from the live node.

When a new row is processed, the CDC process manager checks the cache for partition token match (generated from the row partition key).

If the partition token exists in the CDC process manager cache, it checks the origin (node) of source row.

If the origin (node) of the source row matches the node in the cache, this row data is passed on. From now on, any new rows for the same partition key (partition token) will be accepted from this node.

If the origin (node) of the source row differs the node in the cache, this row is a duplicate and will be filtered out.

In accordance with an embodiment, there is a possibility that nodes may crash/shutdown or can be de-commissioned. If a node is down and the CDC process manager was in the process of reading rows for a particular partition token from the node which went down, the deduplication cache in CDC process manager would have some invalid entries. In this scenario, CDC process manager will start accepting the same row from a different node. This is accomplished by refreshing the deduplication cache based on the current state of the ring.

Additionally, if the extract component process is stopped and restarted, the deduplication cache is rebuilt at startup to avoid duplicates. The cache with partition token and node mapping are serialized to a file when the extract component process is stopped and de-serialized when the extract component process is restarted.

Record Processing Flow

In accordance with an embodiment, the CDC process manager feeds the raw record of type Mutation into CassandraMutationProcessor to generate a CassandraCDCMutation object. In case the mutation has bulk operations, output from CassandraMutationProcessor will be a list of CassandraCDCMutation records. The processed CassandraCDCMutation records then go through a filtering process: If the extract component was positioned to a start timestamp, any records with a timestamp smaller than the start timestamp will be filtered out. If this is a duplicate record from a replica node, it will be filtered out.

In accordance with an embodiment, the duplicate records which were filtered out from replicas are stored into a history cache. The depth of the history cache is configurable. The depth is based on timestamp of the first and last records in the history queue and also record count. The system can also store another cache to keep track of the last unfiltered record processed from every node.

Changes in the ring, will lead to partition tokens (partition token ranges) being shuffled across nodes. Sometimes partition token movement may not be complete and there could be more changes in the ring. There is a possibility that CDC process manager cannot detect the replicas for a particular partition token generated from a record from the commit log. When this scenario occurs (although occurs very rarely), such a record is not filtered out. A message is also logged to indicate the possibility of a duplicate record.

Change Events in the Ring

In accordance with an embodiment, the CassandraTopologyManager will register and listen for the following changes/events in the ring: Node de-commissioned. Node was shutdown. New node added. Node came up (booted). Keyspace added/removed/modified. Table added/removed/modified.

Node De-Commissioned/Shutdown Event

In accordance with an embodiment, when a node is shutdown or de-commissioned from the ring, the CassandraTopologyManager would take the following actions: Clear the deduplication cache to remove all the partition tokens associated with this node. Find the replica nodes of the node which was removed. Find the last record read from the node which went down. Find the matching record in any of the replica records. Replay records from any replica node which has the maximum record history. Update the deduplication cache to link the last record's partition token with the new replica node. Close SSH connection to the node which went down.

Replaying Records from Replica Nodes

In accordance with an embodiment, when a node which was actively feeding records goes down, the CassandraTopologyManager needs to select a replica node and lookup the last record which was processed by the node which went down. If there is more than one replica node with a matching record, the replica with the maximum record history is selected to feed the partition token found in the last record of the node which was shutdown. If a matching record is not found in any of the replicas, again the replica with the maximum record history is selected and also a warning message may be logged to indicate a possible data loss. A parameter can be provided to control warning or ABEND extract action in this scenario.

Node Added/Boot Event

In accordance with an embodiment, when a new node is added to the ring or a node which was down comes up, there is a chance that Cassandra would go about shuffling partition token ranges in the ring. If the extract component was reading data for some partition tokens from an existing node and somehow these partition tokens were moved to another nodes in the ring, the risk is that new data for such partition tokens will be filtered out. The CassandraTopologyManager would take the following actions to address this scenario: Update the deduplication cache to check if any partition tokens are invalid due to the new node in the ring. Open a connection to pull commit logs from the new node. Create position/checkpoint entry (in casschk.json) for the new node.

Remote Commit Log Transfer

In accordance with an embodiment, the class Cassandra-ClusterSFTPClient is a SFTP client which is used to transfer the remote commit logs for processing. This class uses the JSch library. SSH connections are opened for every live node in the cluster and commit logs are pulled into the machine where the extract component process is running. There will be one SSH connection per node on a separate dedicated thread. The connection is kept open until the node is part of the ring.

Cluster Positioning

In accordance with an embodiment, unlike RDBMS's where a single log sequence number would suffice to indicate a unique position to start/restart/alter a capture, a Cassandra cluster with multiple nodes would need to store one position per node. For an 'n' node ring, there will be 'n' position(s). The class ClusterPosition stores the multi-node position. This class also houses another class NodePosition which stores the position for a single node. The class also stores the start timestamp for extract. The position information is saved into a JSON file. The position file is updated at a configurable interval (typically every 10 seconds) and also during shutdown. The extract component positioning is based on this position file. This JSON position file can be manually edited to position extract.

In accordance with an embodiment, an example position JSON file can be illustrated as:

```
{
    "start_timestamp": -1,
    "sequence_id": 11774721,
    "nodes": [
```

```
        {
            "address": "127.0.0.3",
            "file": "CommitLog-6-1502860465106.log",
            "offset": 411806,
            "id": 1502860465106
        },
        {
            "address": "127.0.0.2",
            "file": "CommitLog-6-1502861017180.log",
            "offset": 46621,
            "id": 1502861017180
        },
        {
            "address": "127.0.0.1",
            "file": "CommitLog-6-1502860971369.log",
            "offset": 226525,
            "id": 1502861017180
        }
    ]
}
```

Polling for Data

In accordance with an embodiment, CDC process manager would continuously look for new data in the commit logs. The Java ScheduledExecutor service is used with a job frequency which is configurable.

Schema Loader

In accordance with an embodiment, a class SchemaLoader has the following responsibilities: Read the table wildcard entries from the Cassandra VAM module and expand the wildcards. Load the schema instance as required by a Cassandra client application. The CommitLogReadHandler interface will be able to read commit log segment data only for tables and keyspaces loaded in the current schema instance of the client application, which is the CDC process manager.

Reading from Active Commit Logs

In accordance with an embodiment, the format of the commit log segments in the active commit logs are similar to the CDC commit logs. This enables us to read and position into the active commit logs. Reading active commit logs is a desirable feature as it reduces latency. It is also risky as Cassandra database processes may truncate an active commit log and re-use for future database changes. When an active commit log is truncated, the contents of the active commit will be moved to the CDC directory into a new commit log. This could also result in data duplication but offers lower latency.

Data Types

In accordance with an embodiment, table 1 describes the data type mapping and data types supported for Oracle Golden Gate.

TABLE 1

| Cassandra type | GoldenGate type | Length | Support | Comments |
| --- | --- | --- | --- | --- |
| UTF8Type | GG_DT_CHAR | Variable | Y | UTF-8 encoded string. |
| AsciiType | GG_DT_CHAR | Variable | Y | US-ASCII character string. |
| Int32Type | GG_DT_INTEGER | 4 | Y | 32-bit signed integer. |
| ShortType | GG_DT_INTEGER | 2 | Y | 2 byte integer. |
| IntegerType | GG_DT_INTEGER | 8 | Y | Arbitrary-precision integer, mapped to Java BigInteger. |
| LongType | GG_DT_INTEGER | 8 | Y | |
| ByteType | GG_DT_INTEGER | 1 | Y | 1 byte integer. |
| DecimalType | GG_DT_FLOAT | 8 | Y | Variable-precision decimal. |
| DoubleType | GG_DT_FLOAT | 8 | Y | 64-bit IEEE-754 floating point. |
| FloatType | GG_DT_FLOAT | 4 | Y | 32-bit IEEE-754 floating point. |

TABLE 1-continued

| Cassandra type | GoldenGate type | Length | Support | Comments |
|---|---|---|---|---|
| SimpleDateType | GG_DT_CHAR | | Y | yyyy-mm-dd |
| TimestampType | GG_DT_CHAR | | Y | yyyy-MM-dd:HH:mm:ss.SSS +/− hh:mm |
| TimeType | GG_DT_CHAR | | Y | hh24:mi:ss.SSSSSS |
| BooleanType | GG_DT_BINARY | 1 bit | Y | 0x1 (for true); 0x0 (for false) |
| InetAddressType | GG_DT_CHAR | 45 | Y | ABCD:ABCD:ABCD:ABCD:ABCD:ABCD:ABCD:ABCD or ABCD:ABCD:ABCD:ABCD:ABCD:ABCD:192.168.158.190. IP address string in IPv4 or IPv6 format. |
| UUIDType | GG_DT_CHAR | 36 | Y | 8-4-4-4-12 [ex: 123e4567-e89b-12d3-a456-426655440000]. A UUID in standard UUID format. |
| TimeUUIDType | GG_DT_CHAR | 36 | Y | 8-4-4-4-12 [ex: 123e4567-e89b-12d3-a456-426655440000]. Timestamp based UUID. |
| BLOB | GG_DT_STORED_BLOB | N/A | Y | Cassandra supports a maximum LOB size of 2 GB, recommended size is 1 MB. The trail is written with LOB chunk size of 8000 bytes per chunk. |

Transaction ID (TranID GGS Partition Token)

In accordance with an embodiment, there are no transactions in Cassandra. Every operation record is enclosed in a pseudo transaction with one operation record. This is for compatibility with the VAM API. In accordance with an embodiment, the transaction ID is constructed by the concatenation of the node address, the commit log ID and the offset within the commit log.

Sequence Number (Sequence ID or CSN GGS Partition Token)

In accordance with an embodiment, this will be a simple sequence number starting from 1. Every record written to the trail will have a unique sequence number which increases in its value for every new record written to the trail.

VAM Position→Context

In accordance with an embodiment, VAM data structure Position→Context will be populated with the same value as the transaction ID. This data is not used for positioning by the extract component. The extract component positioning relies on the checkpoint information and the full audit recovery (FAR) logic for exact positioning.

Positioning and Recovery

In accordance with an embodiment, OGG Extract can be positioned to capture as stated below:

Start reading all the available data from the beginning:
GGSCI>ADD EXTRACT cassvamn, TRANLOG Start from current timestamp:
GGSCI>ADD EXTRACT cassvam, TRANLOG, BEGIN NOW Start from a given date and time:
GGSCI>ADD EXTRACT cassvam, TPANLOG, BEGIN 2017-03-27 23:05:05.123456

Restart from Previous Run:

In this instance, the Java module CDC process manager writes a JSON position file under dirchk/casschk.json which has the information about positioning to all the nodes in the cluster.

Positioning and Recovery Scenarios

TABLE 2

| Property | Value |
|---|---|
| Transaction ID | [Node Address]:[CommitLogID]:[Offset] |
| Context | Same as Transaction ID |
| Context Display | Same as Transaction ID |
| Operation timestamp | Original timestamp of the operation. |
| Transaction timestamp | This will be a sequenced timestamp. If the new record's timestamp is lower than the previous record's timestamp, the new record will be assigned the previous record's timestamp. |
| Sequence ID | (Optional) This can be a simple sequence number starting from 1. Every record written to the trail will have a unique sequence number. |

In accordance with an embodiment, the capture process maintains a checkpoint information (e.g., an extended checkpoint file, such as a JSON checkpoint file, as illustrated above) to store the commit log positions of all the nodes in the cluster.

In accordance with an embodiment, whenever the extract component/capture process issues a checkpoint complete event (GG_CONTROL_CHECKPOINT_COMPLETE), the Cassandra VAM module will update the checkpoint information to have the position of all the nodes in the cluster which are feeding data records.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although many of the features and techniques described herein are illustrated using the example of capturing data from a Cassandra database environment; in accordance with various embodiments, the features and techniques can be similarly used to capture data from other types of distributed data source systems, databases, data structures, or data streams, including, but not limited to, for example Apache Cassandra, Kafka, MongoDB, Oracle NoSQL, Google Bigtable, DB2, MySQL, or HDFS.

Thus, from one perspective, there has been described a system and method for capture of change data from a distributed data source system, for example a distributed database or a distributed data stream, and preparation of a canonical format output, for use with one or more heterogeneous targets, for example a database or message queue. The change data capture system can include support for features such as distributed source topology-awareness, initial load, deduplication, and recovery. A technical purpose of the systems and methods described herein includes determination and communication of changes performed to data at a distributed data source that includes a large amount of data across a plurality of nodes, to one or more target computer systems.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for capture of change data from a distributed data source, for use with heterogeneous targets, comprising:
a computer that includes a processor, and operates to capture change data from a distributed data source comprising a plurality of nodes using a capture process, for use with one or more targets, wherein the nodes store data records as rows of data, and wherein changes to the rows of data are committed to source change trace entities;
wherein each node of the plurality of nodes in the distributed data source is associated with a source change trace entity that records data changes that are processed at that node;
wherein each data record is located within a partition within the nodes, and when extracted from the distributed data source said record is associated with a token indicative of a partition and node within the distributed data source providing that record; and
wherein the computer:
determines a distributed source topology associated with the plurality of nodes in the distributed data source, including monitoring for a presence of new nodes or unavailability of one or more of the nodes within the distributed data source, and
accesses the source change trace entities at one or more nodes or replica nodes, to determine the data changes at the distributed data source, for use with the one or more targets, including:
maintaining a cache of data records extracted from the distributed data source wherein the cache includes, for each record within the cache, the token indicative of the node within the distributed data source providing that record, and
determining, based on comparison of the tokens in the cache, to capture a data change associated with a particular record, as provided by a particular node of the distributed data source, wherein a determination is made that the node indicated by the token in the cache matches the source node for the particular record then passing the particular record to the capture process;
wherein if a source node is determined as being unavailable, a recovery process selects, from within the plurality of replica nodes at the distributed data source, based on the token indicative of partition within the distributed data source providing a record, a replica node from which to obtain and replay change data records;
wherein if more than one replica node is associated with the record, a history queue that includes a set of last records read from one or more source nodes is used to select based on record history which replica node to provide the record.

2. The system of claim 1, wherein the distributed data source is one of a distributed database, or a distributed data stream, or other distributed data source, and wherein the one or more targets include one or more of a database, message queue, or other target.

3. The system of claim 1, wherein the computer performs a change data capture process that converts the change data read from the distributed data source, into a canonical format output of the change data, for consumption by the one or more targets.

4. The system of claim 3, whereupon based on a target system to which the change data will be communicated, the canonical format output of the change data is converted to a format used by the target system.

5. The system of claim 3, wherein the computer enables support for a new target system to be provided by a pluggable adapter component that reads the canonical format output of the change data and converts it to a format used by the new target system.

6. The system of claim 1, wherein the computer performs a deduplication process that provides automatic deduplication of the data provided by the distributed data source, whereupon a change to the distributed source topology associated with the distributed data source system, including one or more nodes being added to or removed from the distributed source topology, the deduplication process detects the change to the distributed source topology.

7. The system of claim 1, wherein the computer performs automatic discovery of the distributed source topology associated with the distributed data source system, and provides access to the source change trace entity at each node of the plurality of nodes of the distributed data source system.

8. The system of claim 1, wherein the distributed data source includes nodes that provide records, and wherein the computer upon determining that a particular node in the distributed data source system providing the records becomes unavailable, performs a recovery process that selects a replica node at which to obtain the records.

9. The system of claim 1, wherein the system includes a history queue that includes a set of last records read from one or more source nodes, wherein upon a node becoming unavailable, if the system determines there is more than one replica node with a matching last record, a replica with the maximum record history as determined by the history queue is selected to feed a partition token found in the last record processed by the unavailable node.

10. A method for capture of change data from a distributed data source, for use with heterogeneous targets, comprising:
    capturing change data from a distributed data source comprising a plurality of nodes, using a capture process, for use with one or more targets, wherein the nodes store data records as rows of data, and wherein changes to the rows of data are committed to source change trace entities;
    wherein each node of the plurality of nodes in the distributed data source is associated with a source change trace entity that records data changes that are processed at that node;
    wherein each data record is located within a partition within the nodes, and when extracted from the distributed data source said record is associated with a token indicative of a partition and node within the distributed data source providing that record; and
    wherein the method:
        determines a distributed source topology associated with the plurality of nodes in the distributed source, including monitoring for a presence of new nodes or unavailability of one or more of the nodes within the distributed data source, and
        accesses the source change trace entities at one or more nodes or replica nodes, to determine the data changes at the distributed data source, for use with the one or more targets, including:
            maintaining a cache of data records extracted from the distributed data source wherein the cache includes, for each record within the cache, the token indicative of the node within the distributed data source providing that record, and
            determining, based on comparison of the tokens in the cache, to capture a data change associated with a particular record, as provided by a particular node of the distributed data source, wherein a determination is made that the node indicated by the token in the cache matches the source node for the particular record then passing the particular record to the capture process;
        wherein if a source node is determined as being unavailable, selecting, from within the plurality of replica nodes at the distributed data source, based on the token indicative of partition within the distributed data source providing a record, a replica node from which to obtain and replay change data records;
        wherein if more than one replica node is associated with the record, a history queue that includes a set of last records read from one or more source nodes is used to select based on record history which replica node to provide the record.

11. The method of claim 10, wherein the distributed data source is one of a distributed database, or a distributed data stream, or other distributed data source, and wherein the one or more targets include one or more of a database, message queue, or other target.

12. The method of claim 10, wherein a change data capture process converts the change data read from the distributed data source, into a canonical format output of the change data, for consumption by the one or more targets.

13. The method of claim 12, whereupon based on a target system to which the change data will be communicated, the canonical format output of the change data is converted to a format used by the target system.

14. The method of claim 12, wherein the method enables support for a new target system to be provided by a pluggable adapter component that reads the canonical format output of the change data and converts it to a format used by the new target system.

15. The method of claim 10, wherein the method performs a deduplication process that provides automatic deduplication of the data provided by the distributed data source, whereupon a change to the distributed source topology associated with the distributed data source system, including one or more nodes being added to or removed from the distributed source topology, the deduplication process detects the change to the distributed source topology.

16. The method of claim 10, wherein the method performs automatic discovery of the distributed source topology associated with the distributed data source system, and provides access to the source change trace entity at each node of the plurality of nodes of the distributed data source system.

17. The method of claim 10, wherein the distributed data source includes nodes that provide records, and wherein the method further comprises upon determining that a particular node in the distributed data source system providing the records becomes unavailable, performing a recovery process that selects a replica node at which to obtain the records.

18. The method of claim 10, further comprising providing a history queue that includes a set of last records read from one or more source nodes, wherein upon a node becoming unavailable, if the system determines there is more than one replica node with a matching last record, a replica with the maximum record history as determined by the history queue is selected to feed a partition token found in the last record processed by the unavailable node.

19. A non-transitory computer readable storage medium, including instructions stored thereon which when read and executed by one or more computers cause the one or more computers to perform a method comprising:
    capturing change data from a distributed data source comprising a plurality of nodes, using a capture process, for use with one or more targets, wherein the nodes store data records as rows of data, and wherein changes to the rows of data are committed to source change trace entities;
    wherein each node of the plurality of nodes in the distributed data source is associated with a source change trace entity that records data changes that are processed at that node;
    wherein each data record is located within a partition within the nodes, and when extracted from the distributed data source said record is associated with a token indicative of a partition and node within the distributed data source providing that record; and
    wherein the method:
        determines a distributed source topology associated with the plurality of nodes in the distributed data source, including monitoring for a presence of new nodes or unavailability of one or more of the nodes within the distributed data source, and accesses the source change trace entities at one or more nodes or replica nodes, to determine the data changes at the distributed data source, for use with the one or more targets, including:
- maintaining a cache of data records extracted from the distributed data source wherein the cache includes, for each record within the cache, the token indicative of the node within the distributed data source providing that record, and
- determining, based on comparison of the tokens in the cache, to capture a data change associated with a particular record, as provided by a particular node of the distributed data source, wherein a determination is made that the node indicated by the token in the cache matches the source node for the particular record then passing the particular record to the capture process;

wherein if a source node is determined as being unavailable, selecting, from within the plurality of replica nodes at the distributed data source, based on the token indicative of partition within the distributed data source providing a record, a replica node from which to obtain and replay change data records;

wherein if more than one replica node is associated with the record, a history queue that includes a set of last records read from one or more source nodes is used to select based on record history which replica node to provide the record.

20. The system of claim 1, wherein the distributed data source is provided by a computing environment that stores replicas of data records as rows of data, on a plurality of replica nodes, and indicates changes to the rows of data in commit logs at the replica nodes,
- wherein each data record in the distributed data source is located within a partition within one or more of the replica nodes,
- wherein when a particular row of data is read from a commit log as a change data, the computer generates a partition token for the particular row based on its partition key,
- wherein when a source node is determined as being unavailable, a recovery process selects a replica node for the change data, within the plurality of replica nodes at the distributed data source, from which to obtain or replay change data records.

21. The method of claim 10, wherein the distributed data source is provided by a computing environment that stores replicas of data records as rows of data, on a plurality of replica nodes, and indicates changes to the rows of data in commit logs at the replica nodes,
- wherein each data record in the distributed data source is located within a partition within one or more of the replica nodes,
- wherein when a particular row of data is read from a commit log as a change data, the method generates a partition token for the particular row based on its partition key,
- wherein when a source node is determined as being unavailable, a recovery process selects a replica node for the change data, within the plurality of replica nodes at the distributed data source, from which to obtain or replay change data records.

\* \* \* \* \*

UNITED STATES PATENT AND TRADEMARK OFFICE
CERTIFICATE OF CORRECTION

PATENT NO. : 11,762,836 B2
APPLICATION NO. : 16/145707
DATED : September 19, 2023
INVENTOR(S) : Vasudevan et al.

Page 1 of 1

It is certified that error appears in the above-identified patent and that said Letters Patent is hereby corrected as shown below:

In the Specification

In Column 2, Line 46, delete "embodiment" and insert -- embodiment. --, therefor.

In Column 7, Line 17, delete "source" and insert -- source. --, therefor.

In Column 7, Line 30, delete "records" and insert -- records. --, therefor.

In Column 15, Line 13, delete "ID:6:" and insert -- ID:6; --, therefor.

In Column 15, Line 14, delete "Node2:Position1" and insert -- Node2:Position1; --, therefor.

In Column 16, Line 1, delete "Node2:Position;" and insert -- Node2:Position1; --, therefor.

In Column 18, Line 14, delete "3);" and insert -- 3}; --, therefor.

Signed and Sealed this
Eighteenth Day of June, 2024

Katherine Kelly Vidal
*Director of the United States Patent and Trademark Office*